United States Patent [19]
Isomura et al.

[11] Patent Number: 6,040,673
[45] Date of Patent: Mar. 21, 2000

[54] MOTOR CONTROL APPARATUS

[75] Inventors: Yoshinori Isomura; Masahiro Yasohara, both of Hyogo-ken; Kazuyuki Takada, Osaka-fu, all of Japan

[73] Assignee: Matsushita Electric Industrial Co., Ltd., Osaka-fu, Japan

[21] Appl. No.: 09/320,735

[22] Filed: May 27, 1999

[30] Foreign Application Priority Data

May 29, 1998 [JP] Japan .................................. 10-148958

[51] Int. Cl.⁷ ........................................................ G05B 5/01
[52] U.S. Cl. .......................... 318/615; 318/721; 318/268; 318/432
[58] Field of Search .................................. 318/721, 268, 318/432, 439, 254, 615

[56] References Cited

U.S. PATENT DOCUMENTS

| | | | |
|---|---|---|---|
| 4,527,102 | 7/1985 | Gotou | 318/254 |
| 4,611,158 | 9/1986 | Magase et al. | 318/803 |
| 4,680,526 | 7/1987 | Okuyama et al. | 318/802 |
| 4,749,923 | 6/1988 | Chieng | 318/269 |
| 5,428,285 | 6/1995 | Koyama et al. | 318/799 |
| 5,481,168 | 1/1996 | Mutoh et al. | 318/432 |
| 5,729,449 | 3/1998 | Takada et al. | 363/98 |

FOREIGN PATENT DOCUMENTS 2682657 8/1997 Japan .

*Primary Examiner*—Robert E. Nappi
*Assistant Examiner*—Rita Leykin
*Attorney, Agent, or Firm*—Wenderoth, Lind & Ponack, L.L.P.

[57] ABSTRACT

A motor control apparatus supplies a current to the motor according to the control either by an average current controller or by an instantaneous current controller. The selection of the controller is done by a switching command signal selector, which selects the average current controller when the position deviation is within a specified range, and selects the instantaneous current controller when the position deviation is outside this specified range.

20 Claims, 28 Drawing Sheets

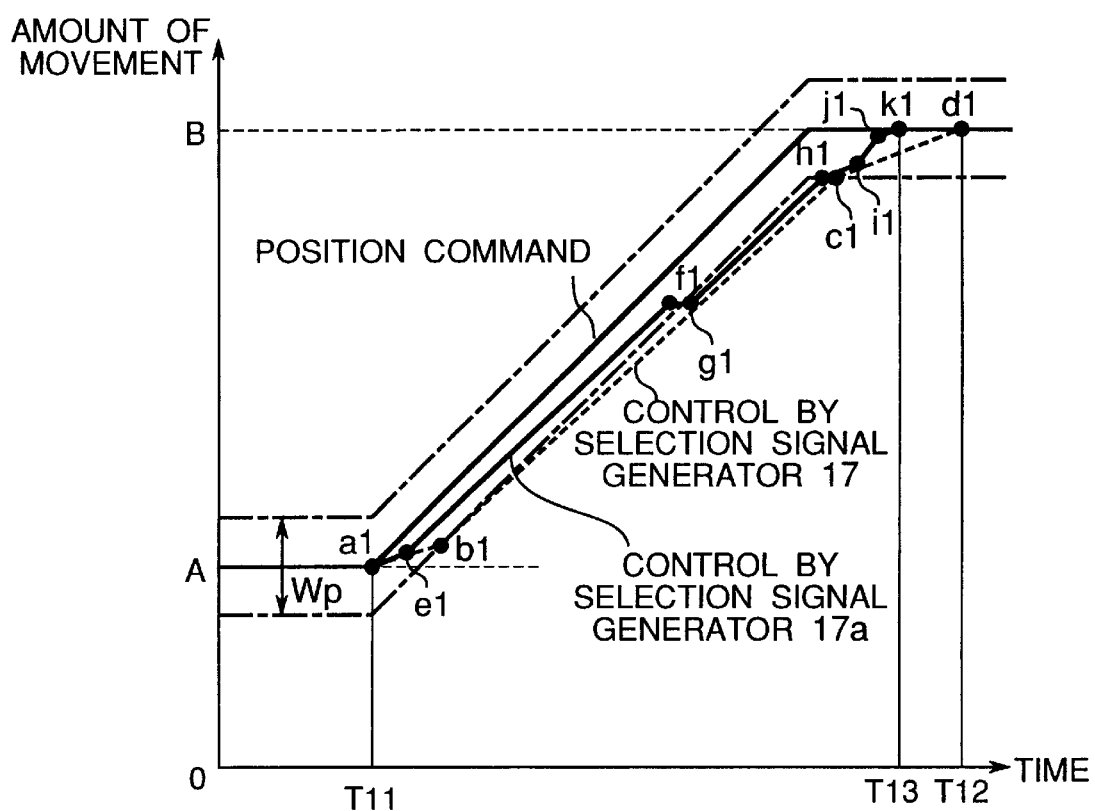

Fig.24A
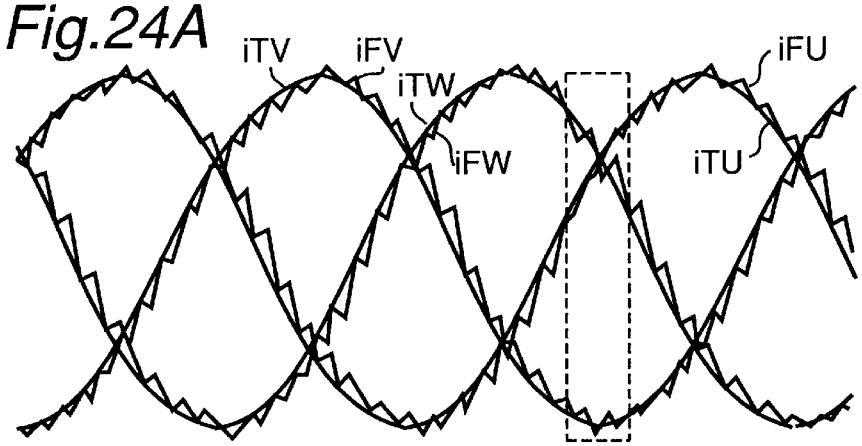
Fig.24B
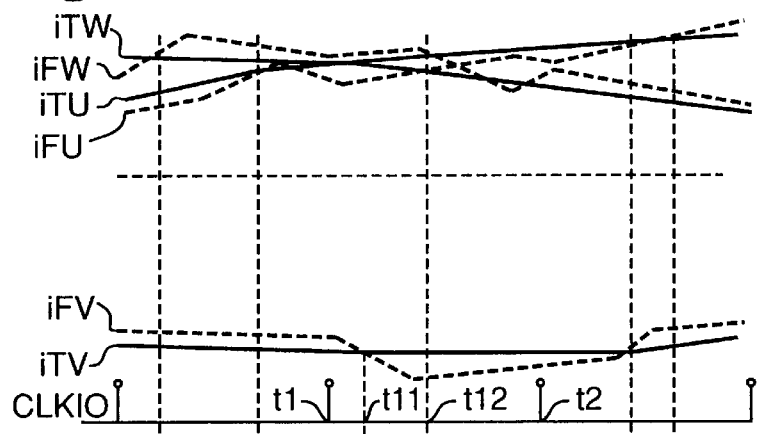
Fig.24C
| No. | E00 | EY1 | EY2 | A00 | AX1 | AX2 | F00 | FY1 | FY2 |
|---|---|---|---|---|---|---|---|---|---|
| HU | L | L | H | L | * | * | L | L | H |
| HV | H | * | * | H | L | L | L | H | H |
| HW | L | H | H | H | H | L | H | * | * |
| PU | H | H | L | H | H | H | H | H | L |
| PV | L | L | L | L | H | H | H | L | L |
| PW | H | L | L | L | L | H | L | L | L |
| Q1 | O | O | X | O | O | O | O | O | X |
| Q2 | X | X | X | X | O | O | O | X | X |
| Q3 | O | X | X | X | X | O | X | X | X |
| Q4 | X | X | O | X | X | X | X | X | O |
| Q5 | O | O | O | O | X | X | X | O | O |
| Q6 | X | O | O | O | O | X | O | O | O |
O : ON    X : OFF
NOTE : PULSE SIGNAL INDICATES THE RISING EDGE OF CLK10

MOTOR CONTROL APPARATUS

BACKGROUND OF THE INVENTION

1. Field of the Invention

The present invention relates to a motor control apparatus for use in industrial applications and information devices.

2. Description of Related Art

FIG. 28 is a schematic diagram of a motor control apparatus according to the related art. This type of motor control apparatus is commonly used for controlling servo motors used in industrial applications. They are also used for motor control in information devices.

A typical motor control apparatus as shown in FIG. 28 is described below with reference to an industrial application using a three-phase motor 1.

In this typical application, a line current detector 6 detects the line current on two supply lines to three-phase motor 1, and determines the line current on the third line by taking the sum of the two detected line currents and inverting the sign. The results are output as first line current measurement iFU, second line current measurement iFV, and third line current measurement iFW. It will be obvious that this line current detector 6 could alternatively detect the line current on all three lines to the three-phase motor 1 to output first line current measurement iFU, second line current measurement iFV, and third line current measurement iFW.

A sensor 2 outputs signals required to detect the position, speed, and movement of a moving element of the three-phase motor 1. The sensor 2 is typically a rotary encoder or resolver.

A moving element position detection counter 7 outputs a moving element angle signal θ, which expresses as an electrical angle the position of the moving element of the three-phase motor 1 based on the output from sensor 2.

A speed detector 8 detects the speed of the moving element of the three-phase motor 1 based on the output from sensor 2 and outputs a speed detection signal. A position detector 9 likewise detects the movement of the moving element of three-phase motor 1 based on the output from sensor 2, and outputs a position detection signal.

A position deviation signal indicative of the deviation between a position command used to drive the three-phase motor 1 to a specific moving element position, and the position detection signal output from the position detector 9, is applied to a position error amplifier 10. The position error amplifier 10 multiplies this position deviation signal by a position gain, and outputs the result as a speed command.

A speed deviation signal indicative of the deviation between the speed command output by the position error amplifier 10, and the speed detection signal output by the speed detector 8, is applied to a speed error amplifier 11. The speed error amplifier 11 similarly multiplies this speed deviation by a speed gain, and outputs the result as a current command.

The moving element angle signal θ output by the moving element position detection counter 7, and the current command output from the speed error amplifier 11, are applied to a line current command generator 12. The line current command generator 12 multiplies signal θ and the current command to output a first line current command iTU, a second line current command iTV, and a third line current command iTW. These line current commands indicate the line current to be supplied to the drive coil for each phase of the three-phase motor 1.

The first line current command iTU, second line current command iTV, and third line current command iTW output from the line current command generator 12, and the first line current measurement iFU, second line current measurement iFV, and third line current measurement iFW output by the line current detector 6, are input to an average current controller 13. The average current controller 13 generates switching command signals PU, PV, and PW so that the first line current command iTU and first line current measurement iFU, second line current command iTV and second line current measurement iFV, and third line current command iTW and third line current measurement iFW, are as close as possible to the same respective values.

A main circuit power element group 4 supplies power from a main circuit dc source 3 to the three-phase motor 1 based on the switching command signals PU, PV, and PW output by the average current controller 13.

A motor control apparatus according to the related art thus described operates as follows.

When the movement of the moving element has not reached the position indicated by the position command, the difference between the position command and the position detection signal, that is, the position deviation signal, is positive. The speed command output from the position error amplifier 10 therefore rises, causing the current command output from the speed error amplifier 11 to also rise. When the current command rises, the line current command generator 12 applies line current command signals to the average current controller 13 resulting in an increase in the line current supplied to each phase drive coil. The average current controller 13 supplies power from the main circuit dc source 3 to the three-phase motor 1 so that the line current flowing to the three-phase motor 1 conforms to the line current command signals.

When the movement of the moving element exceeds the position indicated by the position command, the inverse of the process described above is performed so that the movement of the moving element is again controlled to conform to the position command.

It will be obvious that by means of the operation described above, a motor control apparatus according to the related art is able to control a three-phase motor so that the position of a moving element thereof is controlled to a specified position.

As shown in FIG. 29, the above-noted average current controller 13 comprises three subtracters 41, 42, 43; first, second, and third current error amplifiers 44, 45, and 46; a triangular wave generator 50; and first, second, and third comparators 47, 48, and 49.

The subtracters 41, 42, 43 obtain first, second, and third line current deviations iEU, iEV, and iEW as the respective differences between first, second, and third line current commands iTU, iTV, and iTW and first, second, and third line current measurements iFU, iFV, and iFW.

The first, second, and third current error amplifiers 44, 45, and 46 generate and output voltage command signals VU, VV, and VW based on the first, second, and third line current deviations iEU, iEV, and iEW supplied thereto. The triangular wave generator 50 outputs a triangular wave signal SC, that is, a PWM carrier wave signal.

The voltage command signals VU, VV, and VW are input to the non-inverting input terminal, and the triangular wave signal SC is input to the inverting input terminal, of the first, second, and third comparators 47, 48, and 49, respectively. The comparators thus compare the supplied voltage command signals VU, VV, and VW and triangular wave signal SC, and output the result as switching command signals PU, PV, and PW, respectively.

Thus comprised, the average current controller 13 amplifies the difference between each line current command and line current measurement, represented by the respective current deviation, using a plurality of current error amplifiers, and then compare the resulting voltage commands with a PWM carrier wave signal to generate the switching command signals PU, PV, and PW.

The current error amplifiers 44, 45, and 46 used in this type of average current controller 13 are typically proportional integrating amplifiers with a gain characteristic as defined by equation (1).

$$G(S)=Kp(1+1/Ti \cdot S) \tag{1}$$

The control response of a control system using this type of proportional integrating amplifier can be improved by increasing the gain of the error amplifiers, and the standard deviation can be controlled to substantially zero by setting the integral. FIG. 30 is a waveform diagram of the internal operating signals of the above-noted average current controller 13 and the resulting line current signals flowing to the three-phase motor 1.

A problem with a motor control apparatus according to the related art as thus described is that an excessive increase in the current error amplifier gain causes oscillation due to the phase delay resulting from the electrical time constant of the three-phase motor and phase delay in the current error amplifier, as well as the operating delay of the power elements and excessive time delay generating a three-phase PWM signal. It is therefore common to set the gain of the current error amplifier as high as possible but below the level at which this oscillation occurs. This means that the total transfer function of the current control group must be considered during the design stage based on the characteristics of the three-phase motor, the motor current detector, current controller, and main circuit power group in order to determine the ideal gain setting. More specifically, this means that amplifier gain must be suppressed below the level at which oscillation occurs considering the worst-case scenario that could result from variations in these characteristics as a result of production differences and temperature characteristics.

For the above-described reasons, there is a limit to how high the current gain can be set in this type of conventional motor control apparatus. This further limits the improvement in response to the current command that can be achieved, and thus limits improvement in the response of a speed control and position control system external to the current control system.

Furthermore, while it is desirable to shorten the takt time of machine tools, robots, and other production line equipment in order to improve productivity in industrial applications, this requires improving the positioning response of servo motors used in these machines.

It is likewise desirable to improve the data access time of photocopiers, printers, hard disk drives, DVD drives, CD-ROM drives, and similar products in the information products industry. This also requires improving the control response of the motors used in such information products.

As described above, however, it is difficult to improve control system response with the above-noted conventional motor control apparatus because the current amplifier gain cannot be increased sufficiently. It is therefore not possible with a motor control apparatus according to the related art to achieve the required improvement in response as described above.

SUMMARY OF THE INVENTION

Considering the problems described above, it is therefore an object of the present invention to provide a motor control apparatus in which command response is significantly improved.

According to the first aspect of the present invention, a motor control apparatus described in connection with FIGS. 1, 2 and 3 comprises:

a motor;

a main circuit dc source;

a main circuit power element group for supplying power from the main circuit dc source to a drive coil of the motor;

a line current detector for detecting a line current flowing to a drive coil of the motor, and outputting the detected line current as a line current measurement;

a position detector for detecting movement of a moving element of the motor; and a current controller for controlling the line current so that movement detected by the position detector equals a desired value by applying a switching command signal to the main circuit power element group, the switching command signal being dependent upon a position deviation, which is a difference between movement detected by the position detector and the desired movement;

wherein said current controller comprises:

a line current command generator for outputting based on the position deviation a command signal indicative of a line current to flow to the motor;

an average current controller for comparing a PWM carrier signal and a voltage command signal obtained by amplifying a difference between the line current measurement and line current command signal, and outputting a first switching command signal;

an instantaneous current controller for outputting a second switching command signal based on a comparison of the line current measurement and line current command signal; and a switching command signal selector for selecting and outputting to the main circuit power element group as the switching command signal either the first switching command signal or second switching command signal; and the switching command signal selector selects as the switching command signal the first switching command signal when the position deviation is within a specified range, and selects the second switching command signal when the position deviation is outside this specified range.

According to the second aspect of the present invention, the motor control apparatus as set forth in the first aspect, and described in connection with FIGS. 4, 5 and 6, further comprises: a speed detector for detecting a motor speed and outputting a speed detection signal;

wherein in addition to selecting a switching command signal based on a position deviation, the switching command signal selector detects a speed deviation obtained from a difference between the speed detection signal and position deviation, a temporal change in the speed detection signal, and/or a current deviation obtained from a difference between a line current measurement and line current command signal, and selects as the switching command signal the first switching command signal when the detected value is within a specified range, and selects the second switching command signal when the detected value is not within the specified range.

According to the third aspect of the present invention, a motor control apparatus as described in connection with FIGS. 7, 8 and 9, comprises:

a motor;

a main circuit dc source;

a main circuit power element group for supplying power from the main circuit dc source to a drive coil of the motor;

a line current detector for detecting a line current flowing to a drive coil of the motor, and outputting the detected line current as a line current measurement;

a speed detector for detecting a motor speed and outputting a speed detection signal a position detector for detecting movement of a moving element of the motor; and a current controller for controlling the line current so that movement detected by the position detector equals a desired value by applying a switching command signal dependent upon speed deviation to the main circuit power element group, the speed deviation being a difference between the speed detection signal and position deviation, and the position deviation being a difference between the movement detected by the position detector and the desired movement;

wherein the current controller comprises:

a line current command generator for outputting based on the speed deviation a command signal indicative of a line current to flow to the motor;

an average current controller for comparing a PWM carrier signal and a voltage command signal obtained by amplifying a difference between the line current measurement and line current command signal, and outputting a first switching command signal;

an instantaneous current controller for outputting a second switching command signal based on a comparison of the line current measurement and line current command signal; and a switching command signal selector for selecting and outputting to the main circuit power element group as the switching command signal either the first switching command signal or second switching command signal; and the switching command signal selector selects as the switching command signal the first switching command signal when the speed detection signal indicates a speed of substantially zero, and otherwise selects the second switching command signal.

According to the fourth aspect of the present invention, the motor control apparatus as set forth in the third aspect, and described in connection with FIG. 10, in addition to selecting a switching command signal based on a speed detection signal, the switching command signal selector detects a temporal change in the speed detection signal, and/or a current deviation obtained from a difference between a line current measurement and line current command signal, and selects as the switching command signal the first switching command signal when the detected value is within a specified range, and selects the second switching command signal when the detected value is not within the specified range.

According to the fifth aspect of the present invention, a motor control apparatus as described in connection with FIGS. 11, 12 and 13 comprises:

a motor;

a main circuit dc source;

a main circuit power element group for supplying power from the main circuit dc source to a drive coil of the motor;

a line current detector for detecting a line current flowing to a drive coil of the motor, and outputting the detected line current as a line current measurement;

a speed detector for detecting a motor speed and outputting a speed detection signal a position detector for detecting movement of a moving element of the motor; and a current controller for controlling the line current so that movement detected by the position detector equals a desired value by applying a switching command signal dependent upon speed deviation to the main circuit power element group, the speed deviation being a difference between the speed detection signal and position deviation, and the position deviation being a difference between the movement detected by the position detector and the desired movement;

wherein the current controller comprises:

a line current command generator for outputting based on the speed deviation a command signal indicative of a line current to flow to the motor;

an average current controller for comparing a PWM carrier signal and a voltage command signal obtained by amplifying a difference between the line current measurement and line current command signal, and outputting a first switching command signal;

an instantaneous current controller for outputting a second switching command signal based on a comparison of the line current measurement and line current command signal; and a switching command signal selector for selecting and outputting to the main circuit power element group as the switching command signal either the first switching command signal or second switching command signal; and the switching command signal selector detects a speed deviation, a temporal change in the speed detection signal, and/or a current deviation obtained from a difference between a line current measurement and line current command signal, and selects as the switching command signal the first switching command signal when the detected value is within a specified range, and selects the second switching command signal when the detected value is not within the specified range.

According to the sixth aspect of the present invention, a motor control apparatus as described in connection with FIGS. 14, 15 and 16, comprises:

a motor;

a main circuit dc source;

a main circuit power element group for supplying power from the main circuit dc source to a drive coil of the motor;

a line current detector for detecting a line current flowing to a drive coil of the motor, and outputting the detected line current as a line current measurement;

a speed detector for detecting a motor speed and outputting a speed detection signal a position detector for detecting movement of a moving element of the motor; and a current controller for controlling the line current so that movement detected by the position detector equals a desired value by applying a switching command signal dependent upon a speed command to the main circuit power element group, the speed command being an error amplified position deviation, the position deviation being a difference between the movement detected by the position detector and the desired movement;

wherein the current controller comprises:

a line current command generator for outputting based on the speed command a command signal indicative of a line current to flow to the motor;

an average current controller for comparing a PWM carrier signal and a voltage command signal obtained by amplifying a difference between the line current measurement and line current command signal, and outputting a first switching command signal;

an instantaneous current controller for outputting a second switching command signal based on a comparison of the line current measurement and line current command signal; and a switching command signal selector for selecting and outputting to the main circuit power element group as the switching command signal either the first switching command signal or second switching command signal; and the switching command signal selector selects as the switching command signal the first switching command signal when the speed command indicates a speed of substantially zero, and otherwise selects the second switching command signal.

According to the seventh aspect of the present invention, the motor control apparatus as set forth in the sixth aspect, and described in connection with FIG. 17, in addition to selecting a switching command signal based on a speed command, the switching command signal selector detects a temporal change in the speed detection signal, and/or a current deviation obtained from a difference between a line current measurement and line current command signal, and selects as the switching command signal the first switching command signal when the detected value is within a specified range, and selects the second switching command signal when the detected value is not within the specified range.

According to the eighth aspect of the present invention, a motor control apparatus as described in connection with FIGS. 18, 19 and 20, comprises:

a motor;

a main circuit dc source;

a main circuit power element group for supplying power from the main circuit dc source to a drive coil of the motor;

a line current detector for detecting a line current flowing to a drive coil of the motor, and outputting the detected line current as a line current measurement;

a position detector for detecting movement of a moving element of the motor; and a current controller for controlling the line current so that movement detected by the position detector equals a desired value determined according to a position command applying a switching command signal dependent upon a position deviation to the main circuit power element group, the position deviation being a difference between the movement detected by the position detector and the desired movement;

wherein the current controller comprises:

a line current command generator for outputting based on the position deviation a command signal indicative of a line current to flow to the motor;

an average current controller for comparing a PWM carrier signal and a voltage command signal obtained by amplifying a difference between the line current measurement and line current command signal, and outputting a first switching command signal;

an instantaneous current controller for outputting a second switching command signal based on a comparison of the line current measurement and line current command signal; and a switching command signal selector for selecting and outputting to the main circuit power element group as the switching command signal either the first switching command signal or second switching command signal; and the switching command signal selector selects as the switching command signal the second switching command signal when a temporal change in the position command is not within a specified range, and selects the first switching command signal while temporal change in the position command is within the specified range.

According to the ninth aspect of the present invention, the motor control apparatus as set forth in the first or third aspect, and described in connection with FIG. 21, further comprises a current error amplifier setting arrangement for setting an initial output value of a current error amplifier contained in the average current controller, wherein the average current controller contains the current error amplifier for amplifying a difference between a line current measurement and line current command signal, compares with a PWM carrier signal an output from the current error amplifier as a voltage command signal, and outputs a first switching command signal, and when the switching command signal selector switches the switching command signal selection to the first switching command signal from the second switching command signal output from the instantaneous current controller, the current error amplifier setting arrangement completes setting the initial output value of the current error amplifier before the switching command signal selection is switched so that immediately after the switching command signal selection is switched the initial output value is output from the current error amplifier.

According to the tenth aspect of the present invention, the motor control apparatus as set forth in the ninth aspect, and described in connection with FIG. 21, wherein the current error amplifier setting arrangement sets an integral of the initial output value of the current error amplifier.

According to the eleventh aspect of the present invention, the motor control apparatus as set forth in the ninth aspect, and described in connection with FIG. 11, wherein the current error amplifier setting arrangement sets as the initial output value of the current error amplifier a value calculated from the second switching command signal, which is output from the instantaneous current controller, so that the second switching command signal immediately before the switching command signal is changed matches the first switching command signal immediately after the switching command signal is changed.

According to the twelfth aspect of the present invention, the motor control apparatus as set forth in the tenth aspect, and described in connection with FIG. 11, wherein the current error amplifier setting arrangement sets as the initial output value of the current error amplifier a value calculated from the second switching command signal, which is output from the instantaneous current controller, so that the second switching command signal immediately before the switching command signal is changed matches the first switching command signal immediately after the switching command signal is changed.

According to the thirteenth aspect of the present invention, the motor control apparatus as set forth in the first or third aspect, and described in connection with FIGS. 23 and 24, the motor is a three phase motor;

the line current detector measures line current flowing to each phase drive coil of the three-phase motor, and outputs a first line current measurement, second line current measurement, and third line current measurement;

the line current command generator of the current controller generates and outputs a first line current command signal, a second line current command signal, and a third line current command signal, each indicative of a line current to flow each phase drive coil of the three-phase motor;

the main circuit power element group has a three phase bridge configuration comprising at least:

a first main circuit switching power element connected to a positive terminal of the main circuit dc source for supplying a first line current to the three-phase motor, a second main circuit switching power element connected to a positive terminal of the main circuit dc source for supplying a second line current to the three-phase motor, a third main circuit switching power element connected to a positive terminal of the main circuit dc source for supplying a third line current to the three-phase motor, a fourth main circuit switching power element connected to a negative terminal of the main circuit dc source for supplying a first line current to the three-phase motor, a fifth main circuit switching power element connected to a negative terminal of the main circuit dc source for supplying a second line current to the three-phase motor, and a sixth main circuit switching power element connected to a negative terminal of the main circuit dc source for supplying a third line current to the three-phase motor;

the instantaneous current controller of the current controller comprises:

a first comparator for comparing the first line current command signal and first line current measurement, and setting a first line current comparison result to high when the first line current measurement is greater than the first line current command signal, and low when the first line current measurement is less than the first line current command signal;

a second comparator for comparing the second line current command signal and second line current measurement, and setting a second line current comparison result to high when the second line current measurement is greater than the second line current command signal, and low when the second line current measurement is less than the second line current command signal;

a third comparator for comparing the third line current command signal and third line current measurement, and setting a third line current comparison result to high when the third line current measurement is greater than the third line current command signal, and low when the third line current measurement is less than the third line current command signal;

a logic circuit to which the first line current comparison result, second line current comparison result, and third line current comparison result are supplied for generating a second switching command signal applied to the first, second, third, fourth, fifth, and sixth main circuit switching power elements; and a timing signal generator for generating and applying to the logic circuit a periodic update timing signal;

wherein the logic circuit determines the on and off state for the first, second, third, fourth, fifth, and sixth main circuit switching power elements at the timing indicated by the update timing signal and when the first, second, and third line current comparison results change to output the second switching command signal.

According to the fourteenth aspect of the present invention, the motor control apparatus as set forth in the thirteenth aspect, and described in connection with FIGS. 26 and 27, the timing signal generator outputs the update timing signal near the high or low peak of the PWM carrier signal of the average current controller, and the switching command signal selector switches between the first switching command signal and second switching command signal synchronized to the update timing signal.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 5 is a graph used to describe the operation of the motor control apparatus comprising an alternative selection signal generator as shown in FIG. 4A;

FIGS. 24A, 24B and 24C are graphs used to describe the operation of the motor control apparatus comprising an instantaneous current controller as shown in FIG. 23;

DESCRIPTION OF THE PREFERRED EMBODIMENTS

The preferred embodiments of the present invention are described below with reference to the accompanying figures.

Embodiment 1

Figure 1:
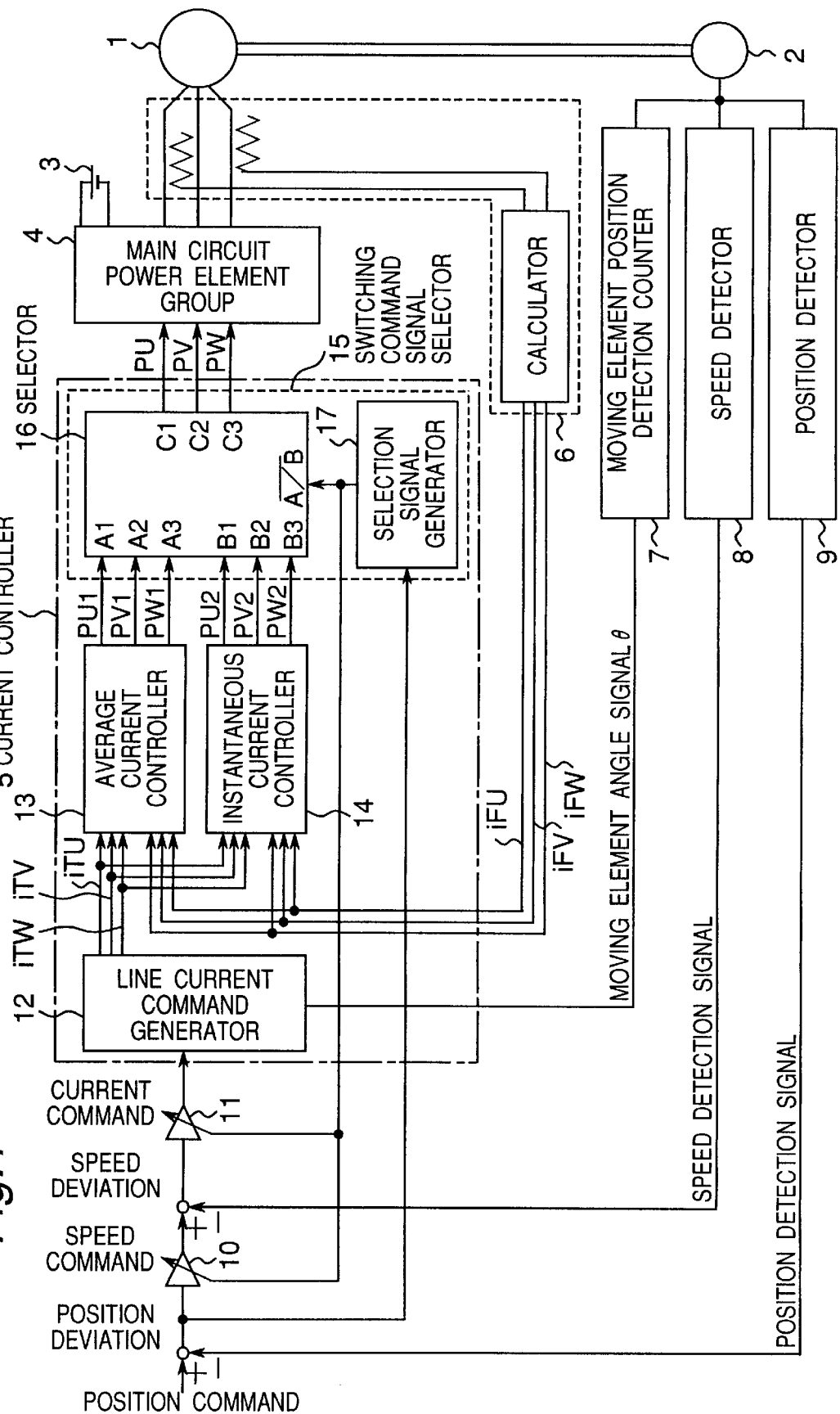
FIG. 1 is a schematic diagram of a motor control apparatus according to a first embodiment of the present invention.

FIG. 1 is a schematic diagram of a motor control apparatus according to this preferred embodiment of the present invention. It should be noted that like parts in FIG. 1 and FIG. 28 are identified by like reference numerals, and further description thereof is omitted below.

Figure 28:
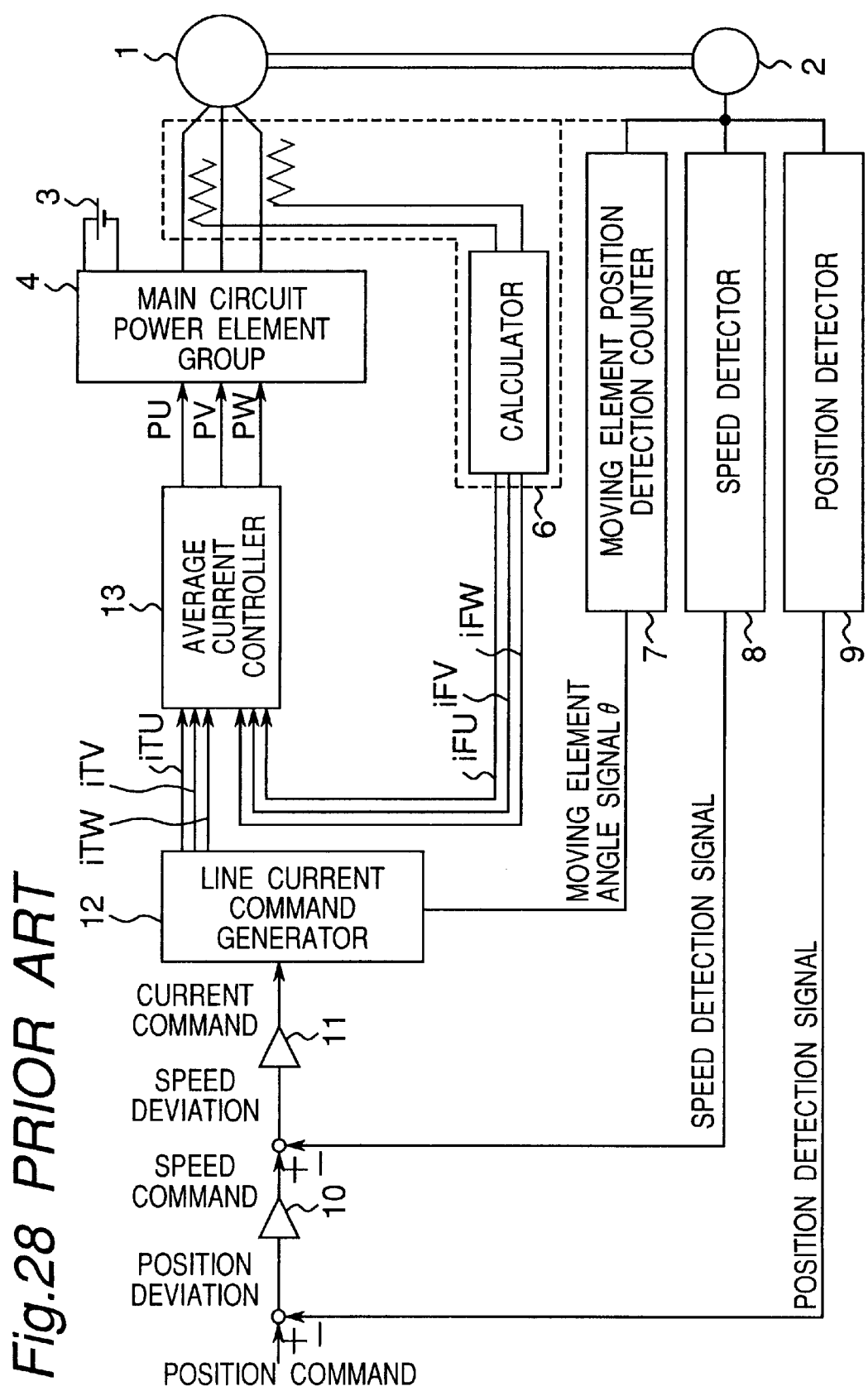
FIG. 28 is a schematic diagram of a conventional motor control apparatus.
Figure 29:
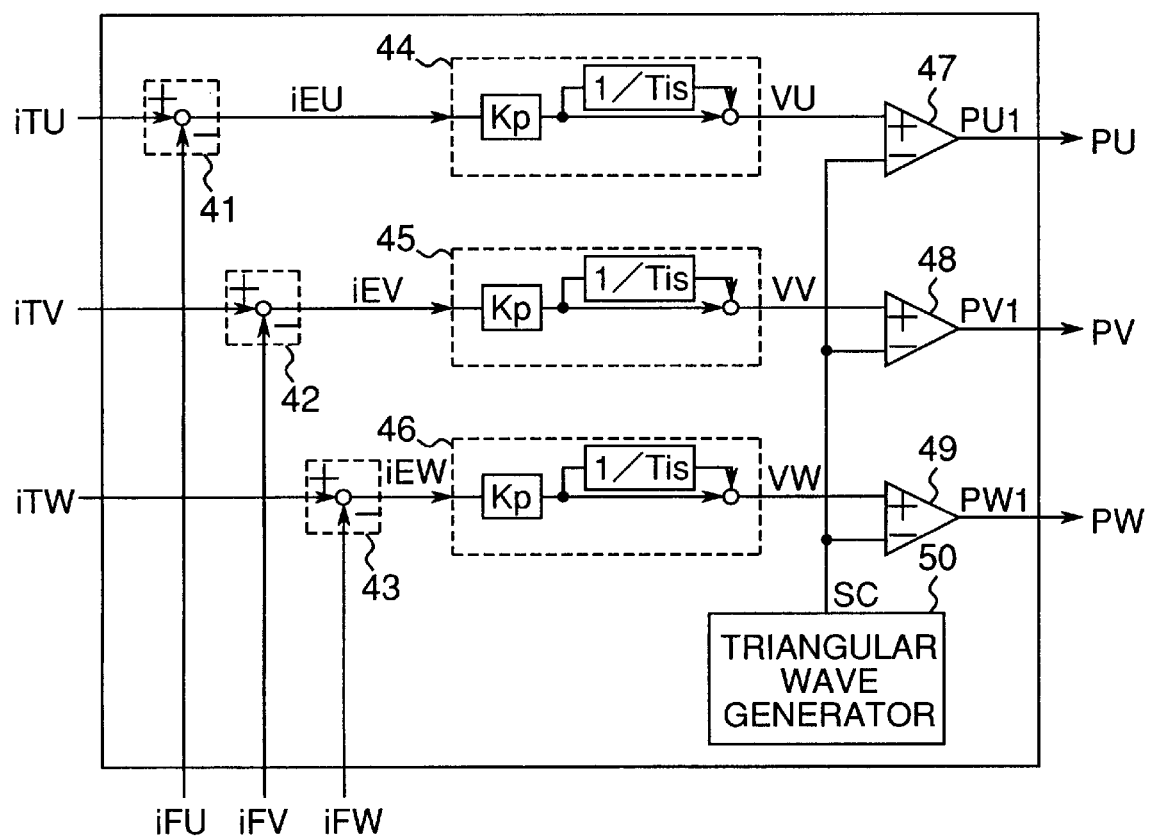
FIG. 29 is a schematic diagram of an average current controller in a conventional motor control apparatus.
Figure 30A:
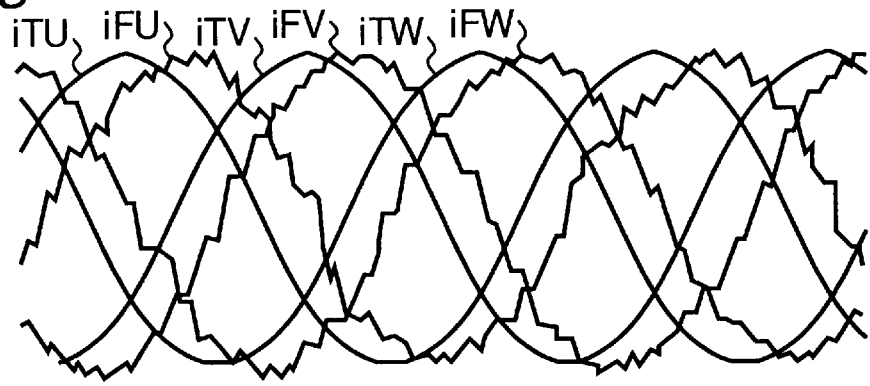
FIG. 30 is a graph used to describe the operation of a conventional motor control apparatus.
Figure 30B:
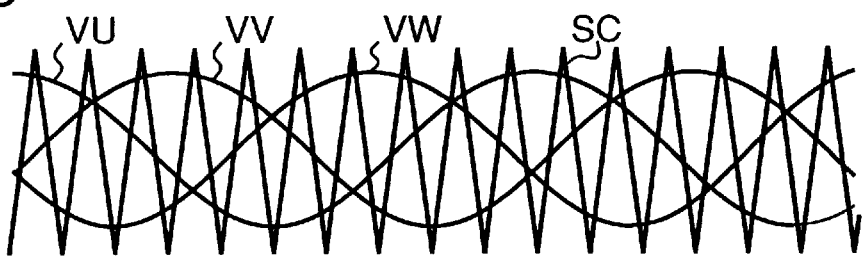
Figure 30C:
Figure 30D:
Figure 30E:

This preferred embodiment of the invention differs from the related art shown in FIG. 28 in that a current controller 5 is further provided. This current controller 5 is described in detail below.

This current controller 5 performs the same function as the line current command generator 12 and average current controller 13 according to the related art as shown in FIG. 28. Note that the average current controller 13 outputs first switching command signals PU1, PV1 and PW1.

The first, second, and third line current commands iTU, iTV, and iTW output from the line current command generator 12, and the first, second, and third line current measurements iFU, iFV, and iFW output from the line current detector 6, are applied to an instantaneous current controller 14. The instantaneous current controller 14 compares the first line current command iTU and first line current measurement iFU, the second line current command iTV and second line current measurement iFV, and the third line current command iTW and third line current measurement iFW, and outputs the results of these comparisons as second switching command signals PU2, PV2, and PW2.

The first switching command signals PU1, PV1 and PW1, and second switching command signals PU2, PV2, and PW2, are applied to a switching command signal selector 15. Comprising a selector 16 and a selection signal generator 17, the switching command signal selector 15 selects one of the command signals input thereto as switching command signals PU, PV, and PW, and outputs the selected signals to the main circuit power element group 4.

The line current detector 6 has A channel inputs A1, A2, and A3; B channel inputs B1, B2, and B3; channel selection input A/B; and outputs C1, C2, and C3. When the channel selection input A/B is low, the signals input to A channel inputs A1, A2, and A3 are selected and passed to outputs C1, C2, and C3; when the channel selection input A/B is high, the B channel inputs B1, B2, and B3 are selected and passed to the outputs C1, C2, and C3.

The position deviation signal, which is the difference between the position command and the position detection signal, is input to the selection signal generator 17. Based on the position deviation indicated by this position detection signal, the selection signal generator 17 selects the signals output by the selector 16 by choosing a selection signal based on the position deviation, and outputting this selection signal to the channel selection input A/B of the selector 16.

The first switching command signals PU1, PV1 and PW1 are applied to the A channel inputs A1, A2, and A3 of the selector 16, and the second switching command signals PU2, PV2, and PW2 are applied to the B channel inputs B1, B2, and B3 of the selector 16. The outputs C1, C2, and C3 of the selector 16 are used as the switching command signals PU, PV, and PW output from the switching command signal selector 15.

The switching command signal selector 15 thus selects the first switching command signals PU1, PV1 and PW1 when the selection signal generator 17 outputs a low selection signal, selects the second switching command signals PU2, PV2, and PW2 when the selection signal is high, and outputs the selected signals as the switching command signals PU, PV, and PW.

The operation of a motor control apparatus comprising the above-noted current controller 5 according to this preferred embodiment of the invention is described next below.

Figure 2:
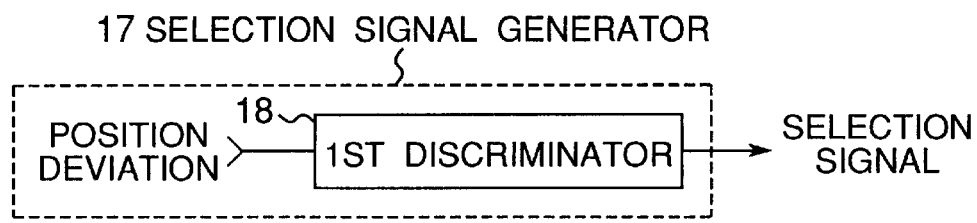
FIG. 2 is a block diagram of a selection signal generator in the motor control apparatus shown in FIG. 1.

The selection signal generator 17 has a first discriminator 18 as shown in FIG. 2 for determining whether the position deviation is within a specific range Wp. If the position deviation is within this range Wp, the selection signal generator 17 outputs the selection signal low; if not within range Wp, the selection signal is output high. This operation is described more fully below.

Figure 3:
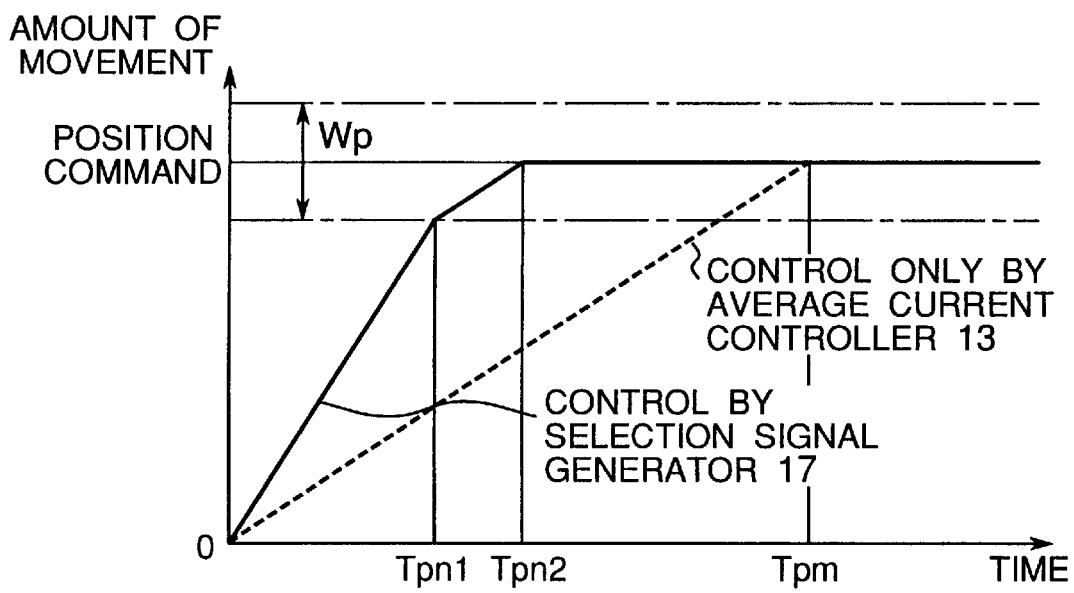
FIG. 3 is a graph used to describe the operation of the motor control apparatus shown in FIG. 1.

FIG. 3 is a graph showing the change over time in the movement of a moving element in response to a position command, and is referred to below to describe the operation of this preferred embodiment of the invention.

When a position command is applied at time 0, the three-phase motor 1 generates torque so as to move the moving element thereof to the position indicated by the position command, and the moving element thus begins to move.

If the position deviation is not within this specific range Wp, the first discriminator 18 causes the selection signal generator 17 to output a high selection signal. The switching command signal selector 15 thus selects the second switching command signals PU2, PV2, and PW2, and outputs these selected signals as the switching command signals PU, PV, and PW applied to the main circuit power element group 4.

As a result, when the position deviation is not within the specific range Wp, a current control circuit is completed by means of instantaneous current controller 14.

Though described in further detail below, it should be here noted that the current control circuit completed using the instantaneous current controller 14 has greater gain than does the circuit using the average current controller 13.

It is therefore possible to increase the gain of the speed control circuit and position control circuit outside the current control circuit, and thereby improve the response of the overall control system.

Note that the example shown in FIG. 1 is configured to increase the gain of the position error amplifier 10 and speed error amplifier 11 when current control using the instantaneous current controller 14 is selected by the selection signal output from the selection signal generator 17. It is therefore possible to increase the speed at which the moving element moves, and thus more quickly drive the position deviation to zero, that is, shorten the period to time Tpn1 at which the position deviation is within the range Wp.

After the position deviation is within the range Wp, the first discriminator 18 causes the selection signal generator 17 to output the selection signal low. As a result, the switching command signal selector 15 outputs the first switching command signals PU1, PV1 and PW1 as the switching command signals PU, PV, and PW to the main circuit power element group 4.

As a result, a current control circuit is completed through the average current controller 13.

When the current control circuit is thus completed through the average current controller 13, gain must be suppressed as described with respect to the related art above. The speed at which the moving element travels is thus reduced compared with using the instantaneous current controller 14, but the position deviation goes to zero by time Tpn2, and positioning is completed.

This is shown in FIG. 3 wherein the dotted line indicates operation using a current control circuit in which only average current controller 13 is used according to a conventional motor control apparatus.

As will be known from FIG. 3, the time from time 0 to when the position deviation is zero at time Tpm is greater with a motor control apparatus using only an average current controller 13 according to the related art because the control system gain must be suppressed. A motor control apparatus according to this preferred embodiment, however, completes positioning at time Tpn2, and thus provides faster positioning response compared with the related art.

Why a current control system using an instantaneous current controller 14 has greater gain than a system using only an average current controller 13 is described next below.

A current control system using an average current controller 13 amplifies the current deviation, that is, the difference between the line current command signal and line current measurement, at a suppressed gain level so that the control system does not begin to oscillate. A voltage derived from the resulting voltage command is then applied to the drive coil of the three-phase motor 1.

A current control system using an instantaneous current controller 14, however, compares the line current command signal and line current measurement, and applies the full positive voltage charge of the main circuit dc source 3 to the drive coil of the motor when the line current command signal is greater than the line current measurement; if the line current measurement is greater than the command signal, the full negative voltage charge is applied.

The gain of a current control system using an instantaneous current controller 14 is thus significantly greater than the gain of a system using only an average current controller 13. As a result, the line current of the three-phase motor drive coil can be very quickly matched to the line current command, and response is thus excellent.

The response of a speed control circuit and positioning control circuit can also be increased, and positioning can thus be completed at high speed, by means of this preferred embodiment of the invention because a current control circuit is formed using an instantaneous current controller 14 having high gain and excellent response. The time required for the position deviation to be brought within the specific range Wp is thus significantly shortened.

Although an average current controller 13 is used to complete positioning once the position deviation is brought within the specific range Wp, this is to avoid noise resulting from high speed line current changes due to from control by the instantaneous current controller 14.

While the selection signal generator 17 used in the above preferred embodiment is comprised as shown in FIG. 2, the selection signal generator 17 can be any one of selection signal generators 17a, 17b, 17c, and 17d in FIGS. 4A, 4B, 4C and 4D, respectively.

The selection signal generator 17a shown in FIG. 4A and operation therewith are described next below.

Figure 4A:
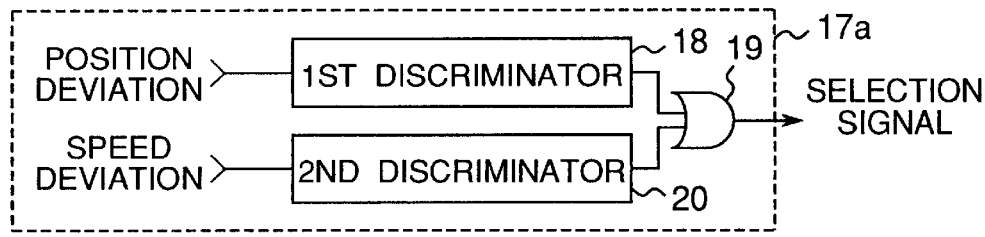
FIGS. 4A, 4B, 4C and 4D show alternative selection signal generators in the motor control apparatus shown in FIG. 1.

As shown in FIG. 4A, selection signal generator 17a further comprises a second discriminator 20 and a first OR gate 19. The second discriminator 20 determines whether the speed deviation is within a specific range Ws1 where the speed deviation is the difference between the speed command output from the position error amplifier 10 and the speed detection signal output by the speed detector 8. The first OR gate 19 obtains the logical sum of the second discriminator 20 and first discriminator 18 outputs, and passes the result of this OR operation as the selection signal.

The second discriminator 20 in this selection signal generator 17a outputs low when the speed deviation is within the specific range Ws1, and outputs high when not within the specific range Ws1.

A selection signal generator 17a thus comprised outputs a low selection signal when both the position deviation and speed deviation are within the respective specific ranges Wp and Ws1 and outputs a high selection signal when either the position deviation or speed deviation is not within the specific range.

As a result, the current control circuit is completed through the average current controller 13 when both the position deviation and speed deviation are within the specific ranges, and is completed through the instantaneous current controller 14 when either the position or speed deviation is outside the specified range.

The operation of a motor control apparatus comprising this selection signal generator 17a is described next with reference to FIG. 5 and FIG. 6.

FIG. 5 is used to describe the operation when a position command causing the moving element to move from point A to point B is applied at time T11.

When the position command changes at time T11 in FIG. 5 so that the moving element is to move from point A to point B, the position deviation increases and torque is thus applied to the moving element. The moving element thus begins moving from point a1 to point e1 so as to track the position command.

If the position deviation and speed deviation are both within the specified ranges Wp and Ws1 while the moving element travels from point a1 to point e1, the selection signal generator 17a keeps the current control circuit completed through the average current controller 13, and the moving element tracks the position command at a moderate speed.

If the speed of moving element travel is moderate compared with the change indicated by the position command, the speed deviation increases and before long exceeds the specific range Ws1. If the speed deviation exceeds the specific range Ws1 at operating point e1, the selection signal generator 17a changes the output selection signal to high. The current control circuit is thus switched from the average current controller 13 to the instantaneous current controller 14.

When the current control circuit is completed through the instantaneous current controller 14, the gain of the overall control system increases, and the speed at which the moving element tracks the position command thus increases. As a result, the moving element travels at high speed from operating point e1 to point f1.

When the moving element travels at high speed, the speed deviation again decreases. When the speed deviation is again within the specific range Ws1, at operating point f1 in this example, the selection signal generator 17a switches the current control circuit back to the average current controller 13. The change in moving element speed therefore moderates as the moving element travels to point g1.

When the moving element thus reaches operating point g1, the position deviation exceeds the specific range Wp. As a result, the selection signal generator 17a switches the current control circuit yet again, this time back to the instantaneous current controller 14. The moving element thus travels at a high rate from g1 to point h1.

When the moving element then reaches point h1 and the position deviation is once again within the specific range Wp, the selection signal generator 17a switches the current control circuit back to the average current controller 13 again. Moving element speed therefore moderates again as the moving element approaches point i1.

If the speed deviation again exceeds the specific range Ws1 at point i1, the selection signal generator 17a again completes the current control circuit through the instantaneous current controller 14. The moving element thus moves rapidly from i1 to point j1.

When the moving element travels at high speed, the speed deviation again decreases. When the speed deviation is again within the specific range Ws1, at operating point j1 in this example, the selection signal generator 17a switches the current control circuit back to the average current controller 13. The change in moving element speed therefore again moderates.

The moving element thus eventually reaches the destination point k1 at time T13, and positioning is completed.

Note that the dotted line in FIG. 5 indicates the movement of the moving element over time when operation is controlled using the selection signal generator 17 shown in FIG. 2. It will be remembered that the selection signal generator 17 in FIG. 2 switches the current control circuit between the average current controller 13 and instantaneous current controller 14 based only on the position deviation. As a result, the current control circuit is not switched to the instantaneous current controller 14 until the moving element travels from point a1 through point e1 to point b1, at which time the position deviation exceeds the specific range Wp. In addition, while the speed deviation exceeds the specified range at point c1, the current control circuit is not switched to the instantaneous current controller 14 as it is at point i1 when travel is controlled by selection signal generator 17a.

It is therefore possible to more quickly detect that the moving element has deviated from the position command, and thereby rapidly track the moving element to the position command, by replacing selection signal generator 17 with selection signal generator 17a, and using both position deviation and speed deviation to selectively switch the current control circuit between the average current controller 13 and instantaneous current controller 14. As a result, it is possible to further improve positioning control response.

Operation when there is noise is described next with reference to FIG. 6. It is assumed in FIG. 6 that noise occurring at time T21 forces the moving element to travel from operating point a2 to point e2. If the speed of moving element travel is great at this time, the speed deviation increases and soon exceeds the specific range Ws1.

As described above, the selection signal generator 17a switches the current control circuit from average current controller 13 to instantaneous current controller 14 when the speed deviation exceeds the specific range Ws1, and the gain of the overall control system rises. The ability of the moving element to return to the original state thus increases.

If the current control circuit switches to the instantaneous current controller 14 at point e2, the moving element begins moving rapidly toward point f2 as the control system drives the moving element back to the intended position, and finally reaches the original position g2 at time T23.

The speed at which the moving element returns to the original position drops at point f2 because the speed deviation re-enters the specific range Ws1, and the current control circuit therefore switches to the low gain average current controller 13.

Figure 6:
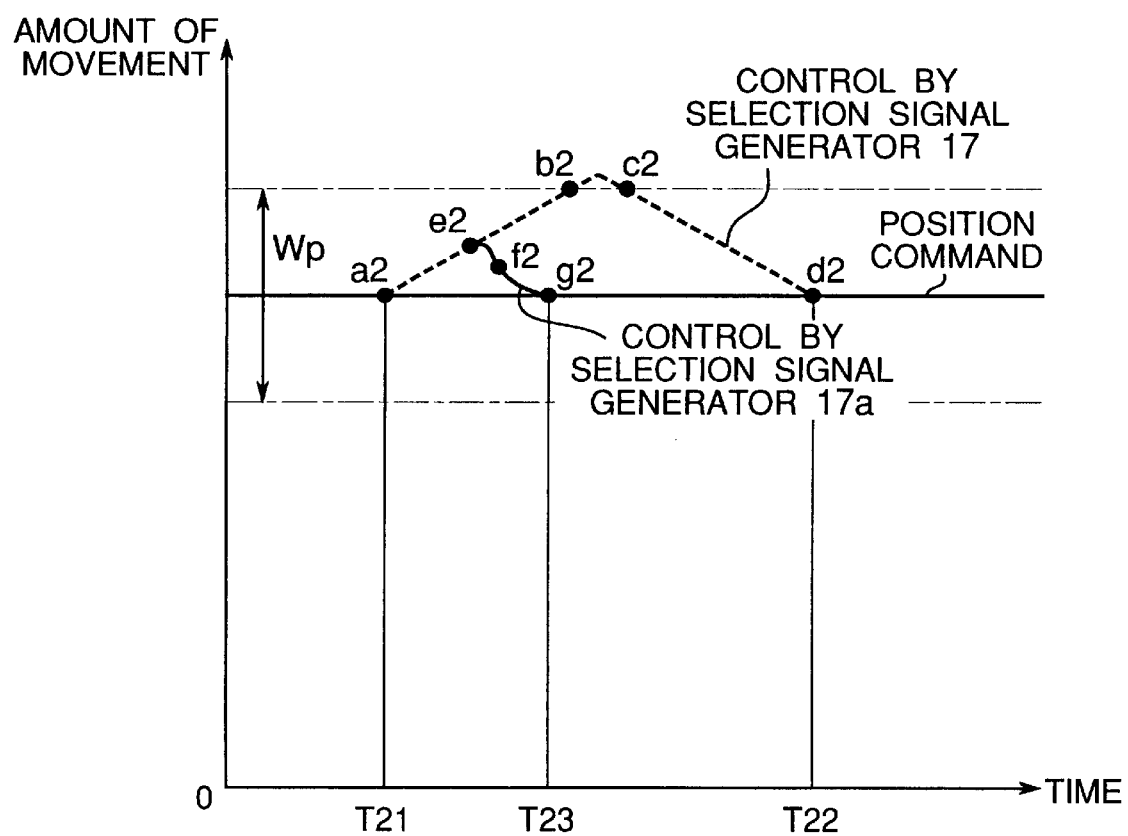
FIG. 6 is used to describe noise suppression in a motor control apparatus comprising an alternative selection signal generator as shown in FIG. 4A.

Note that operation controlled by the selection signal generator 17 shown in FIG. 2 in this case is indicated by the dotted line in FIG. 6. In this case, the current control circuit is switched between the average current controller 13 and instantaneous current controller 14 based only on the position deviation. As a result, the ability to return the moving element to the original position does not increase until the moving element reaches operating point b2 at which the position deviation exceeds the specific range Wp. As a result, the moving element returns to the original position at time T22, noticeably later than time T23.

It will thus be obvious that by using selection signal generator 17a instead of selection signal generator 17, the effects of noise on moving element position can be detected more quickly, and the moving element can thus be quickly restored to the position indicated by the position command. In other words, the selection signal generator 17a improves the ability of the motor control apparatus to suppress noise.

It is therefore possible as described above to more quickly detect that the moving element has deviated from the position indicated by the position command, and thereby rapidly track the moving element based on the position command, by replacing selection signal generator 17 with selection signal generator 17a, and using both position deviation and speed deviation to selectively switch the current control circuit between the average current controller 13 and instantaneous current controller 14. As a result, it is possible to further improve positioning control response and noise suppression.

Figure 4B:
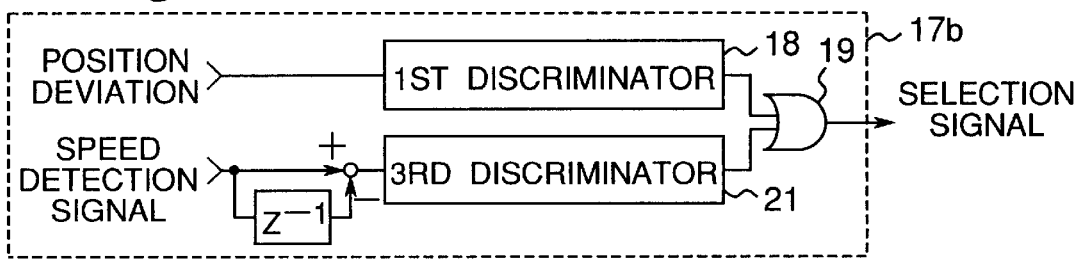
Figure 4C:
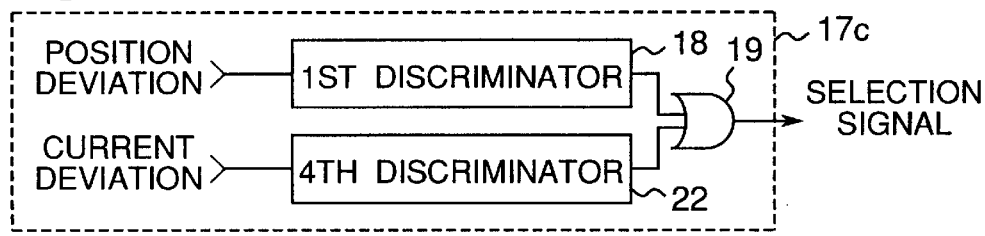
Figure 4D:
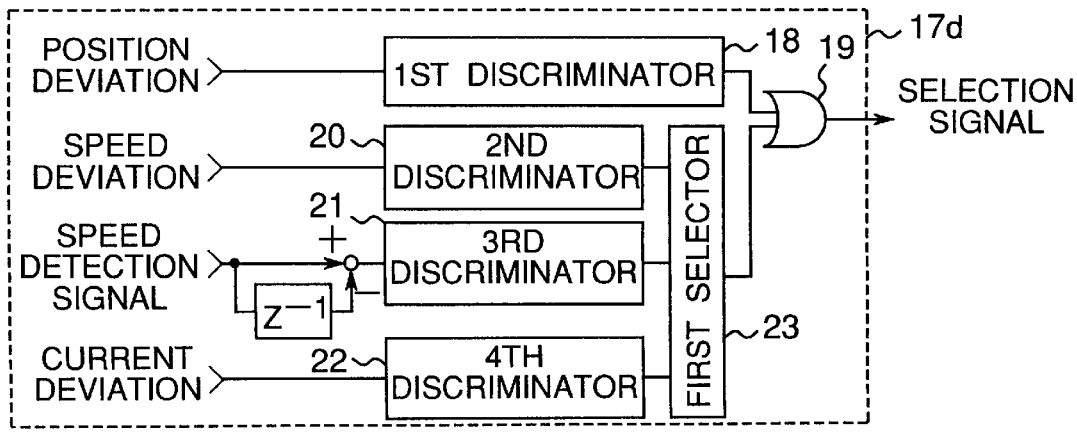

As also noted above, the selection signal generator 17 can also be replaced by any one of selection signal generators 17b, 17c, and 17d as shown in FIGS. 4B, 4C and 4D, respectively, in place of the above-described selection signal generator 17a.

As described above, a selection signal generator 17a according to this preferred embodiment switches between average current controller 13 and instantaneous current controller 14 by determining whether both the position deviation and speed deviation are within specific predetermined ranges. It is also possible, however, to select the average current controller 13 or instantaneous current controller 14 based on the position deviation and speed change as per selection signal generator 17b; based on the position deviation and current deviation as per selection signal generator 17c; or based on the position deviation and a combination of speed deviation, speed change, and current deviation information as per selection signal generator 17d.

It should be noted that selection signal generator 17b can detect deviation of the moving element from the position command position and switch to control using the instantaneous current controller 14 more quickly than can selection signal generator 17a, and selection signal generator 17c can perform this operation even more quickly than can selection signal generator 17b. As a result, it is possible to yet further improve the positioning control response and noise suppression effects described above. This is because signals further inside the control loop can respond more quickly to noise and position command changes.

It should be further noted that the first selector 23 in selection signal generator 17d outputs a combination of determination results based on the speed deviation, speed change, and current deviation. It will be obvious to one with ordinary knowledge in the related art, however, that any type of signal processing operation can be applied to obtain the selection signal, including as necessary prioritizing these values, applying majority logic, and weighting.

As described above, a motor control apparatus according to this preferred embodiment comprises a selection signal generator 17 for determining whether the position deviation of a moving element is within a specific range Wp, and based on this determining switching to a current control circuit whereby the first switching command signals PU1, PV1 and PW1 from an average current controller 13 are output as the switching command signals PU, PV, and PW, or second switching command signals PU2, PV2, and PW2 from an instantaneous current controller 14 are output as the switching command signals PU, PV, and PW. As a result, a current control circuit is completed using a high gain instantaneous current controller 14 until movement of the moving element of the three-phase motor 1 reaches a desired position. As a result, a high speed positioning control response can be achieved.

This positioning control response can be further improved, and noise suppression can be improved, by substituting a selection signal generator 17a, 17b, 17c, or 17d as shown in FIG. 4 for the above-described selection signal generator 17 so that the current control circuit is switched to use an average current controller 13 or instantaneous current controller 14 by considering speed deviation, speed change, or current deviation, or some combination thereof, in addition to position deviation.

It should also be noted that the first to fourth discriminators 18, 20, 21, and 22 of selection signal generators 17, 17a, 17b, 17c, and 17d can also have hysteresis. When thus comprised it is possible to switch the current control circuit between the average current controller 13 and instantaneous current controller 14 without chattering, and stabilize motor behavior at the moment positioning is completed, even when the position deviation, speed deviation, time change in the speed detection signal, or current deviation overshoot or undershoot at the moment positioning control is completed.

Embodiment 2

Figure 7:
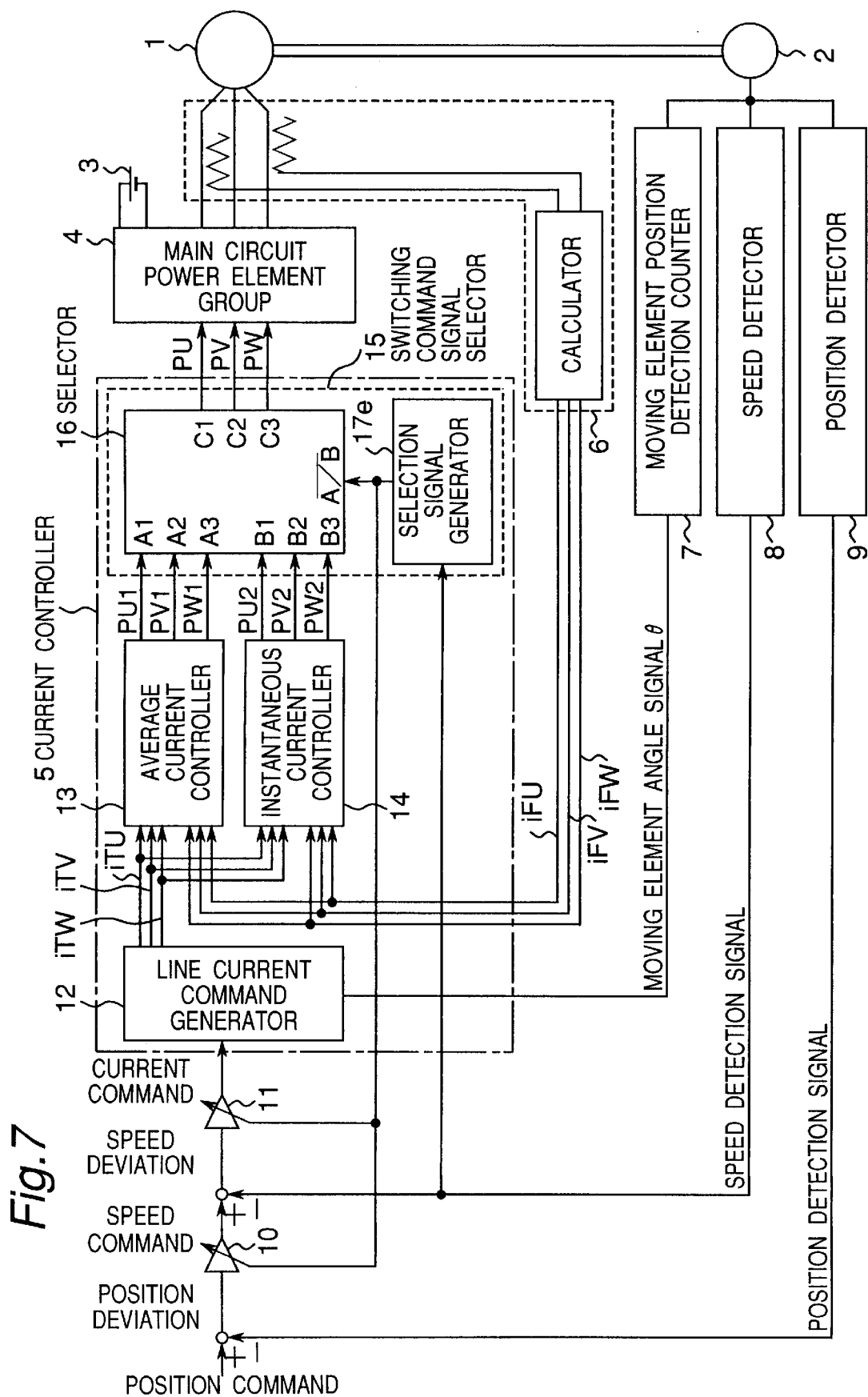
FIG. 7 is a schematic diagram of a motor control apparatus according to a second embodiment of the present invention.

A motor control apparatus according to a second preferred embodiment of the present invention is shown in FIG. 7. Note that like parts in the embodiment shown in FIG. 7 and the first embodiment shown in FIG. 1 are identified by like reference numerals, and further description thereof is omitted below.

The motor control apparatus shown in FIG. 7 differs from the first embodiment in that selection signal generator 17 is replaced by selection signal generator 17e. This selection signal generator 17e further considers whether the speed of the moving element is within a range Ws3 substantially near zero to switch between average current controller 13 and instantaneous current controller 14. More specifically, when the moving element speed is in this range Ws3, the selection signal generator 17e selects the average current controller 13; when not in this range Ws3 the selection signal generator 17e selects a current control circuit using instantaneous current controller 14.

The operation of a motor control apparatus comprising a selection signal generator 17e according to this second embodiment is described next below.

Figure 8:
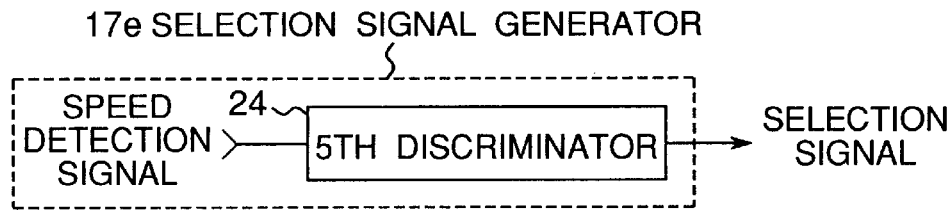
FIG. 8 is a block diagram of a selection signal generator in the motor control apparatus shown in FIG. 7.

As shown in FIG. 8, selection signal generator 17e according to this preferred embodiment comprises a fifth discriminator 24 for determining whether the speed detection signal is within this range Ws3 near zero. When the speed detection signal is within range Ws3, the selection signal generator 17e outputs a low selection signal; when not within range Ws3, it outputs high.

When the speed detection signal is within range Ws3, the current control circuit is completed through average current controller 13; when outside this range Ws3, the current control circuit is completed through instantaneous current controller 14.

Figure 9A:
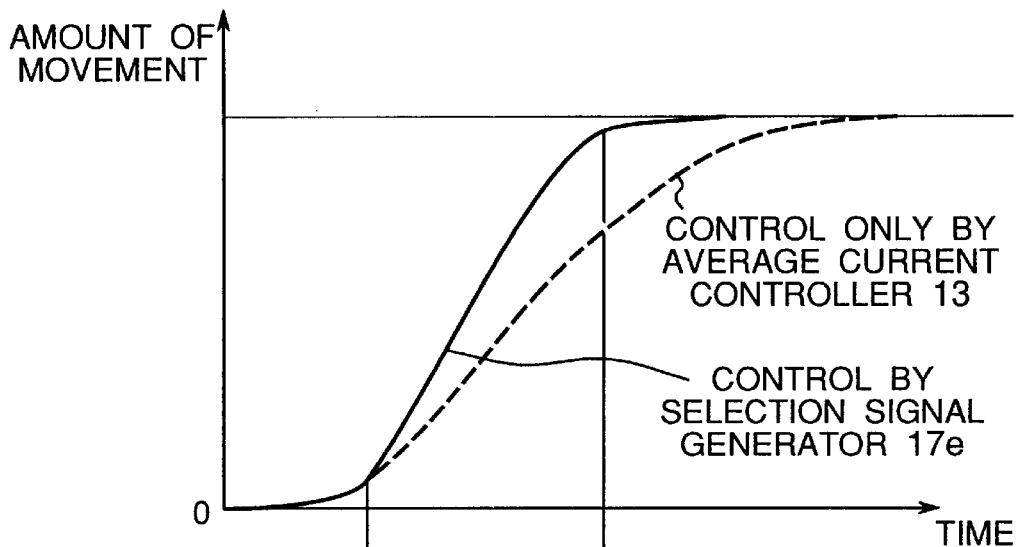
FIGS. 9A and 9B are graphs used to describe the operation of the motor control apparatus shown in FIG. 7.
Figure 9B:
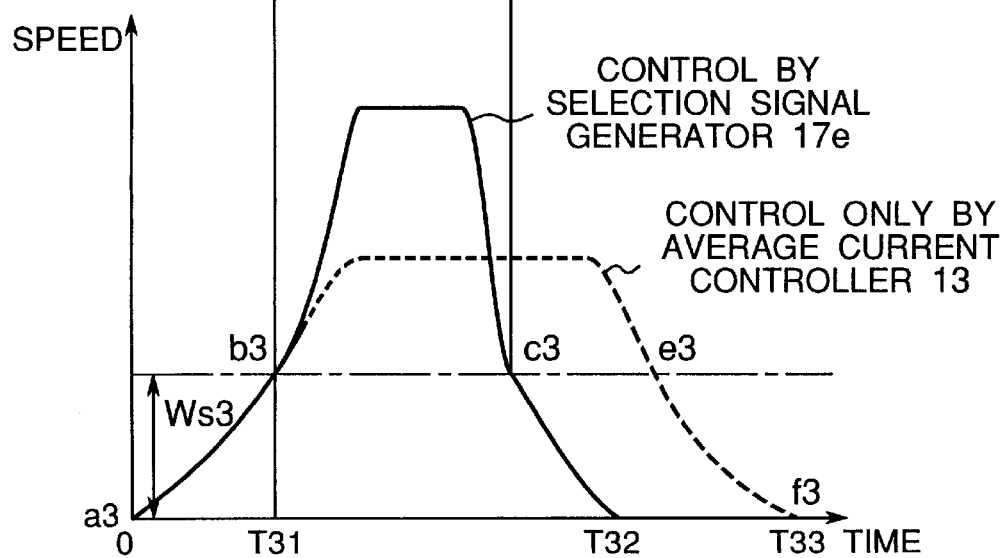

FIGS. 9A and 9B are graphs showing the change over time in the movement of a moving element in response to a position command, and are referred to below to describe the operation of this preferred embodiment of the invention.

When a position command is applied at time 0, the three-phase motor 1 generates torque so as to move the moving element thereof to the position indicated by the position command, and the moving element thus begins to move.

Immediately after the moving element begins to move, the speed thereof is low, and the speed detection signal is within the range Ws3. The selection signal output from selection signal generator 17e is therefore low, and the current control circuit is completed through average current controller 13.

The moving element gradually accelerates, however, causing the speed detection signal to exceed the range Ws3. At this time the fifth discriminator 24 causes the selection signal generator 17e to output the selection signal high. As a result, the switching command signal selector 15 selects the second switching command signals PU2, PV2, and PW2 as the switching command signals PU, PV, and PW output to the main circuit power element group 4.

In other words, the current control circuit is completed through instantaneous current controller 14. As described in the first embodiment, the gain of position error amplifier 10 and speed error amplifier 11 is thus increased, causing the moving element to move quickly. The selection signal generator 17e thus operates to move the moving element at high speed to the position indicated by the position command.

When moving element movement approaches the position command position, the speed of the moving element is reduced. As a result, the speed detection signal again enters the range Ws3. The fifth discriminator 24 thus causes the selection signal generator 17e to output the selection signal low. As a result, the first switching command signals PU1, PV1 and PW1 are applied to the main circuit power element group 4 as the switching command signals PU, PV, and PW. In other words, a current control circuit is completed through average current controller 13. The speed of the moving element thus decreases, position deviation is reduced to zero at time T32, and positioning is completed.

This is shown in FIGS. 9A and 9B wherein the dotted line indicates operation using a current control circuit in which only average current controller 13 is used according to a conventional motor control apparatus.

As will be known from FIGS. 9A and 9B, the time from time 0 to when the position deviation is zero at time T33 is greater with a motor control apparatus using only an average current controller 13 according to the related art because the control system gain must be suppressed. A motor control apparatus according to this preferred embodiment, however, completes positioning at time T32, and thus provides faster positioning response compared with the related art.

The response of a speed control circuit and positioning control circuit can also be increased, and positioning can thus be completed at high speed, by means of this preferred embodiment of the invention because a current control circuit is formed using an instantaneous current controller 14 having high gain and excellent response until the speed detection signal is brought within the range Ws3.

Figure 10A:
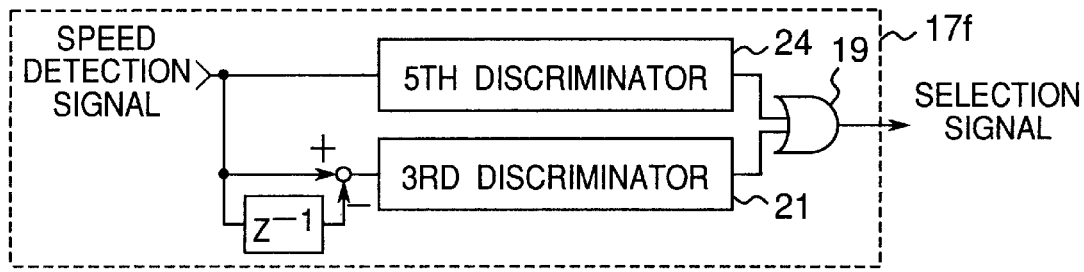
FIGS. 10A, 10B and 10C show alternative selection signal generators in the motor control apparatus shown in FIG. 7.
Figure 10B:
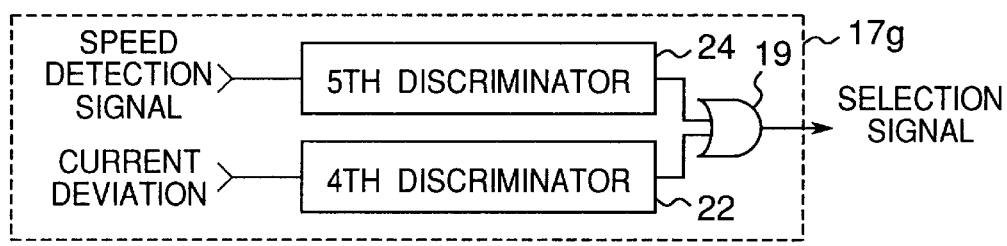
Figure 10C:
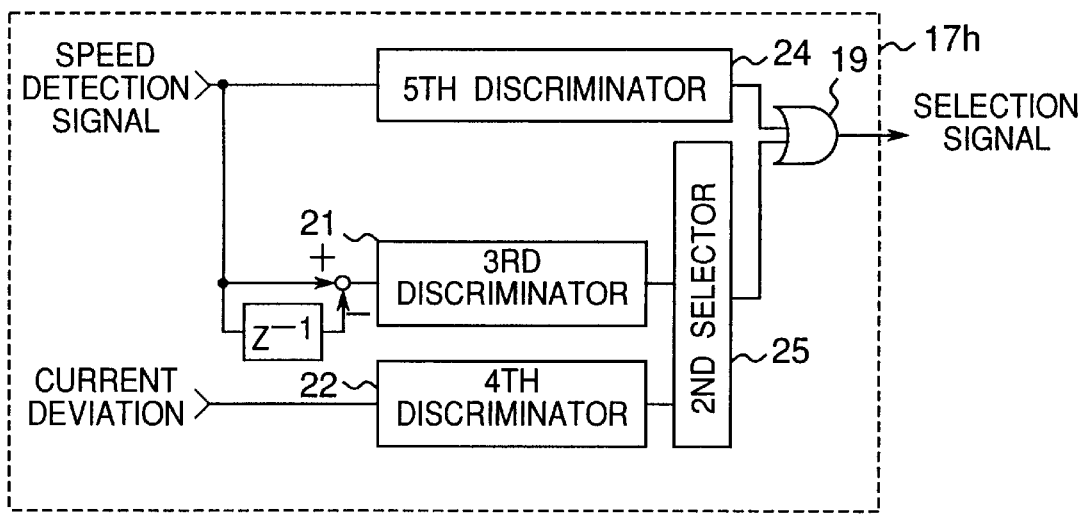

The selection signal generator 17e used in the above preferred embodiment as shown in FIG. 8 can be any one of selection signal generators 17f, 17g, or 17h as shown in FIGS. 10A, 10B and 10C, respectively.

That is, while the above-noted selection signal generator 17e selects the average current controller 13 or instantaneous current controller 14 based on whether the speed detection signal is within a specific range, the average current controller 13 and instantaneous current controller 14 can alternatively be selected using in addition to the speed detection signal a detected speed change as per selection signal generator 17f; a current deviation as per selection signal generator 17g; or a combination of speed change and current deviation as per selection signal generator 17h.

In this case, as in the first embodiment above, positioning control response and noise suppression can be improved in the same manner achieved by substituting a selection signal generator 17a, 17b, 17c, or 17d in FIG. 4 for the selection signal generator 17 in FIG. 2.

In addition, it should be noted that selection signal generator 17f can detect deviation of the moving element from the position command position and switch to control using the instantaneous current controller 14 more quickly than can selection signal generator 17e, and selection signal generator 17g can perform this operation even more quickly than can selection signal generator 17f. As a result, it is possible to yet further improve the positioning control response and noise suppression effects described above. This is because signals further inside the control loop can respond more quickly to noise and position command changes.

It should be further noted that the second selector 25 in selection signal generator 17h outputs a combination of determination results based on the speed change and current deviation. It will be obvious to one with ordinary knowledge in the related art, however, that any type of signal processing operation can be applied to obtain the selection signal, including as necessary prioritizing these values, applying majority logic, and weighting.

It should also be noted that the third to fifth discriminators 21, 22, and 24 of selection signal generators 17e, 17f, 17g, and 17h can also have hysteresis. When thus comprised it is possible to switch the current control circuit between the average current controller 13 and instantaneous current controller 14 without chattering, and stabilize motor behavior at the moment positioning is completed, even when the speed detection signal, time change in the speed detection signal, or current deviation overshoot or undershoot at the moment positioning control is completed.

It will thus be obvious that a motor control apparatus according to this preferred embodiment achieves the same benefits as the first embodiment.

Embodiment 3

Figure 11:
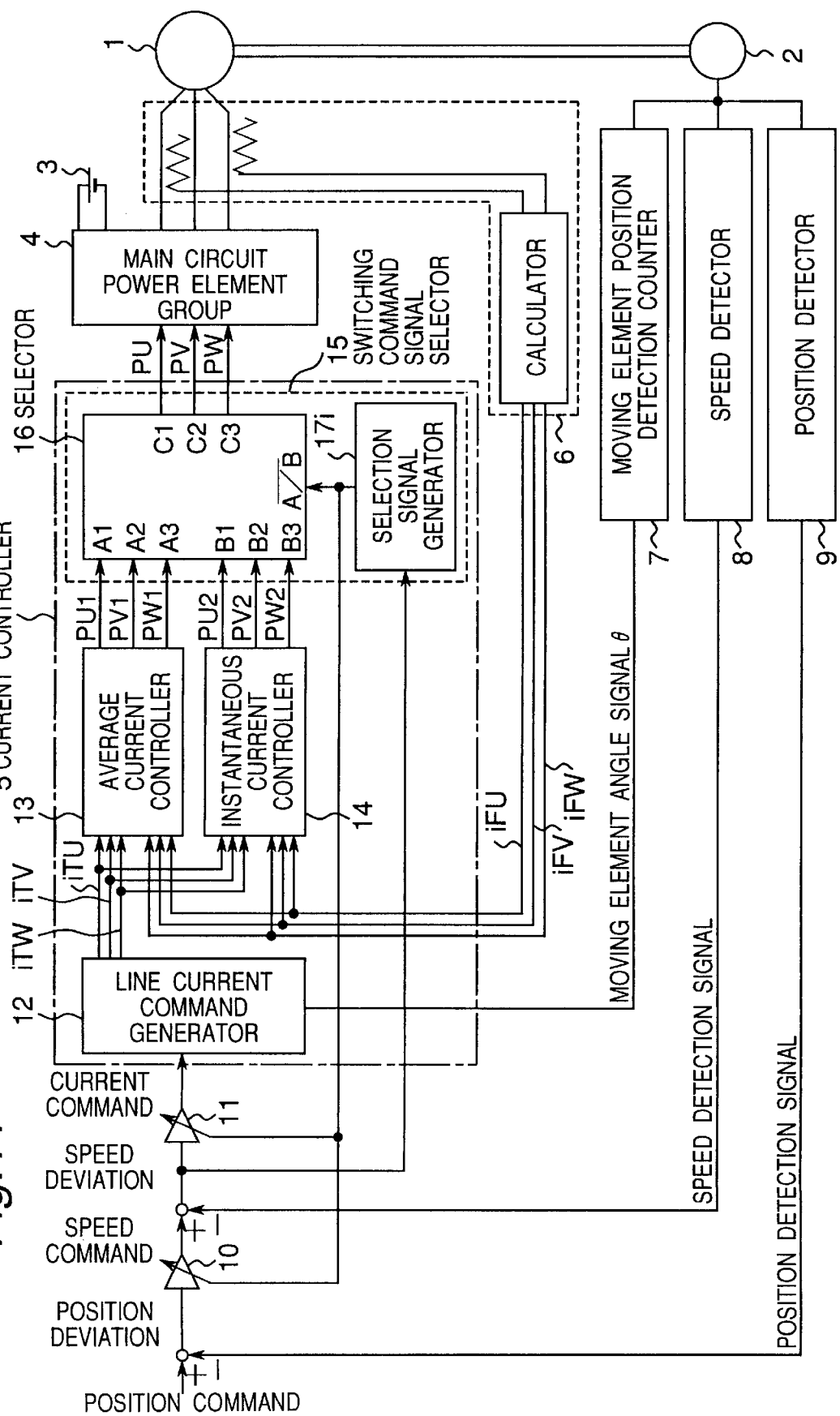
FIG. 11 is a schematic diagram of a motor control apparatus according to a third embodiment of the present invention.

A motor control apparatus according to a third preferred embodiment of the present invention is shown in FIG. 11. Note that like parts in the embodiment shown in FIG. 11 and the first embodiment shown in FIG. 1 are identified by like reference numerals, and further description thereof is omitted below.

The motor control apparatus shown in FIG. 11 differs from the first embodiment in that selection signal generator 17 is replaced by selection signal generator 17i. This selection signal generator 17i has a speed deviation signal input thereto, and switches between the average current controller 13 and instantaneous current controller 14 based on whether this speed deviation is within a specific range Ws1. That is, when the speed deviation is within specific range Ws1, the selection signal generator 17i selects the current control circuit completed through average current controller 13; when not within specific range Ws1, it selects the current control circuit completed through instantaneous current controller 14.

The operation of a motor control apparatus comprising a selection signal generator 17i according to this third embodiment is described next below.

Figure 12A:
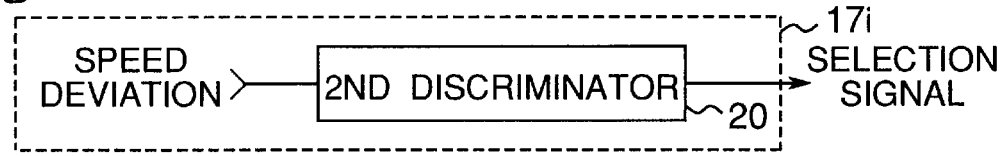
FIGS. 12A, 12B, 12C and 12D show alternative selection signal generators in the motor control apparatus shown in FIG. 11.

As shown in FIG. 12A, this selection signal generator 17i comprises a second discriminator 20 for determining whether the speed deviation is within specific range Ws1. As described in the first embodiment, the second discriminator 20 outputs low when the speed deviation is within specific range Ws1, and outputs high when it is not.

The selection signal thus goes low when the speed deviation is within specific range Ws1, and a current control circuit is completed through average current controller 13; when the speed deviation is outside specific range Ws1, the selection signal goes high, and the current control circuit is completed through instantaneous current controller 14.

The selection signal generator 17i shown in FIG. 12A and operation therewith are described next below with reference to FIG. 13.

It is assumed below that a position command is applied at time T0 with the moving element at operating point a4 in FIG. 13.

When the position command is applied at point a4, the speed command also increases. As a result, speed deviation also increases. If the speed deviation exceeds this specific range Ws1 at this time, a current control circuit is completed through instantaneous current controller 14. The moving element thus begins moving rapidly toward operating point b4 because the control gain is high. The speed deviation also trends lower because the speed of moving element movement is relatively high. If the speed deviation is within specific range Ws1 by operating point b4, the current control circuit is switched to the average current controller 13. Control gain is thus somewhat suppressed, and the moving element travels toward operating point c4 at a somewhat reduced rate of travel.

However, because the speed of moving element travel decreases as the moving element travels toward point c4, the speed deviation trends upward. If this deviation exceeds specific range Ws1 at point c4, the current control circuit is completed through instantaneous current controller 14. Moving element speed thus increases again.

This sequence of operations, that is, alternating between average current controller 13 and instantaneous current controller 14 current control circuits, is thereafter repeated at points d4, e4, and f4 until positioning is completed at point g4 at time T42.

Figure 13:
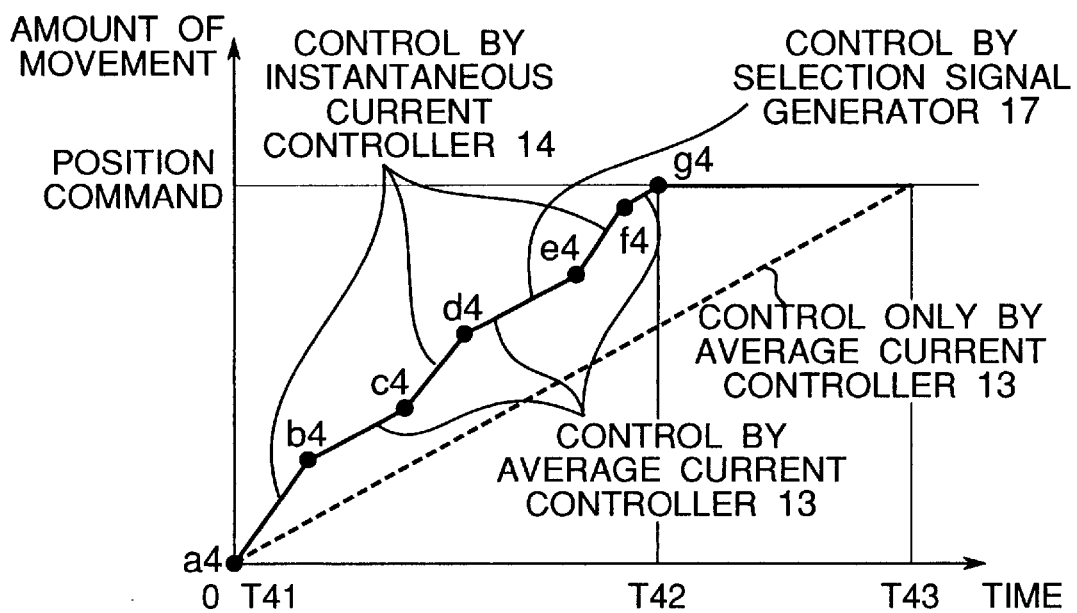
FIG. 13 is a graph used to describe the operation of the motor control apparatus shown in FIG. 11.

Note that the dotted line in FIG. 13 indicates operation using a current control circuit in which only average current controller 13 is used according to a conventional motor control apparatus.

As will be known from FIG. 13, the time from time 0 to when the position deviation is zero at time T43 is greater with a motor control apparatus using only an average current controller 13 according to the related art because the control system gain must be suppressed. A motor control apparatus according to this preferred embodiment, however, completes positioning at time T42, and thus provides faster positioning response compared with the related art.

As does a motor control apparatus according to the first embodiment, this preferred embodiment also achieves a high speed control response characteristic.

In addition, transient noise appearing during the positioning process can be reduced by alternating between the average current controller 13 and instantaneous current controller 14 current control circuits until positioning is completed. This is because control by the average current controller 13 works to moderate the change in the line current until positioning is completed.

Figure 12B:
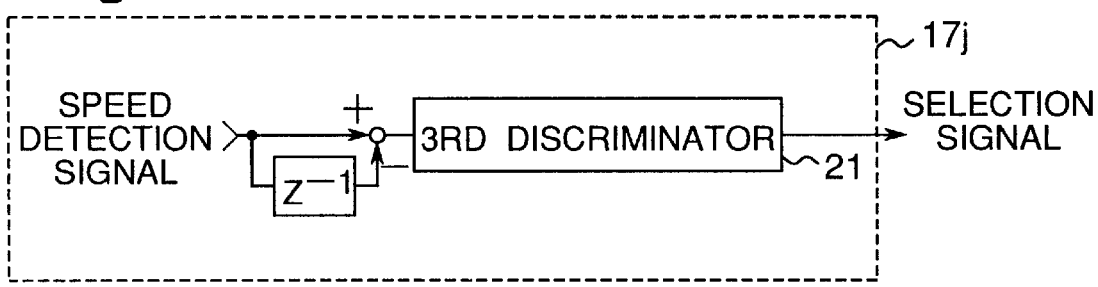
Figure 12C:
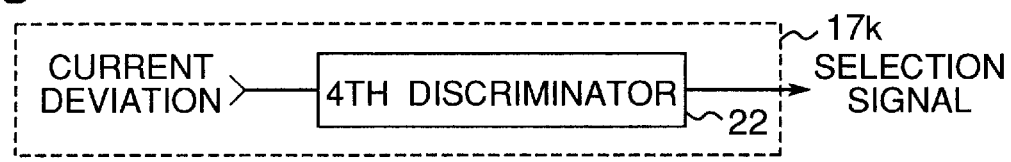
Figure 12D:
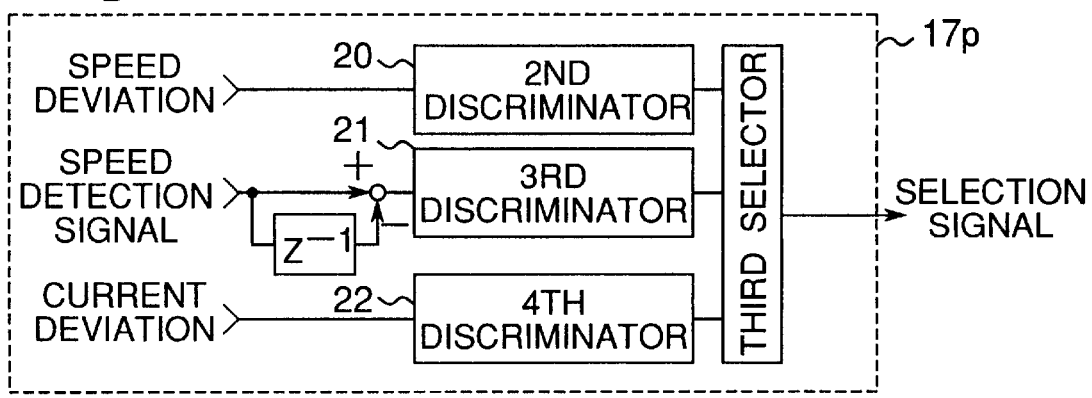

It should also be noted that the selection signal generator 17i can be any one of selection signal generators 17j, 17k, and 17p shown in FIGS. 12B, 12C and 12D, respectively.

That is, the average current controller 13 and instantaneous current controller 14 can alternatively be selected using a detected speed change as per selection signal generator 17j; a current deviation as per selection signal generator 17k; or a combination of speed deviation, speed change and current deviation as per selection signal generator 17p.

In this case, as in the first embodiment above, positioning control response and noise suppression can be improved in the same manner achieved by substituting a selection signal generator 17a, 17b, 17c, or 17d in FIG. 4 for the selection signal generator 17 in FIG. 2.

In addition, it should be noted that selection signal generator 17j can detect deviation of the moving element from the position command position and switch to control using the instantaneous current controller 14 more quickly than can selection signal generator 17i, and selection signal generator 17k can perform this operation even more quickly than can selection signal generator 17j. As a result, it is possible to yet further improve the positioning control response and noise suppression effects described above. This is because signals further inside the control loop can respond more quickly to noise and position command changes.

It should be further noted that the third selector in selection signal generator 17p outputs a combination of determination results based on the speed deviation, speed change and current deviation. It will be obvious to one with ordinary knowledge in the related art, however, that any type of signal processing operation can be applied to obtain the selection signal, including as necessary prioritizing these values, applying majority logic, and weighting.

It should also be noted that the second to fourth discriminators 20, 21, and 22 of selection signal generators 17i, 17j, 17k, and 17p can also have hysteresis. When thus comprised it is possible to switch the current control circuit between the average current controller 13 and instantaneous current controller 14 without chattering, and stabilize motor behavior at the moment positioning is completed, even when the speed detection signal, time change in the speed detection signal, or current deviation overshoot or undershoot at the moment positioning control is completed or transiently when switching between current control circuits during the positioning process.

Embodiment 4

Figure 14:
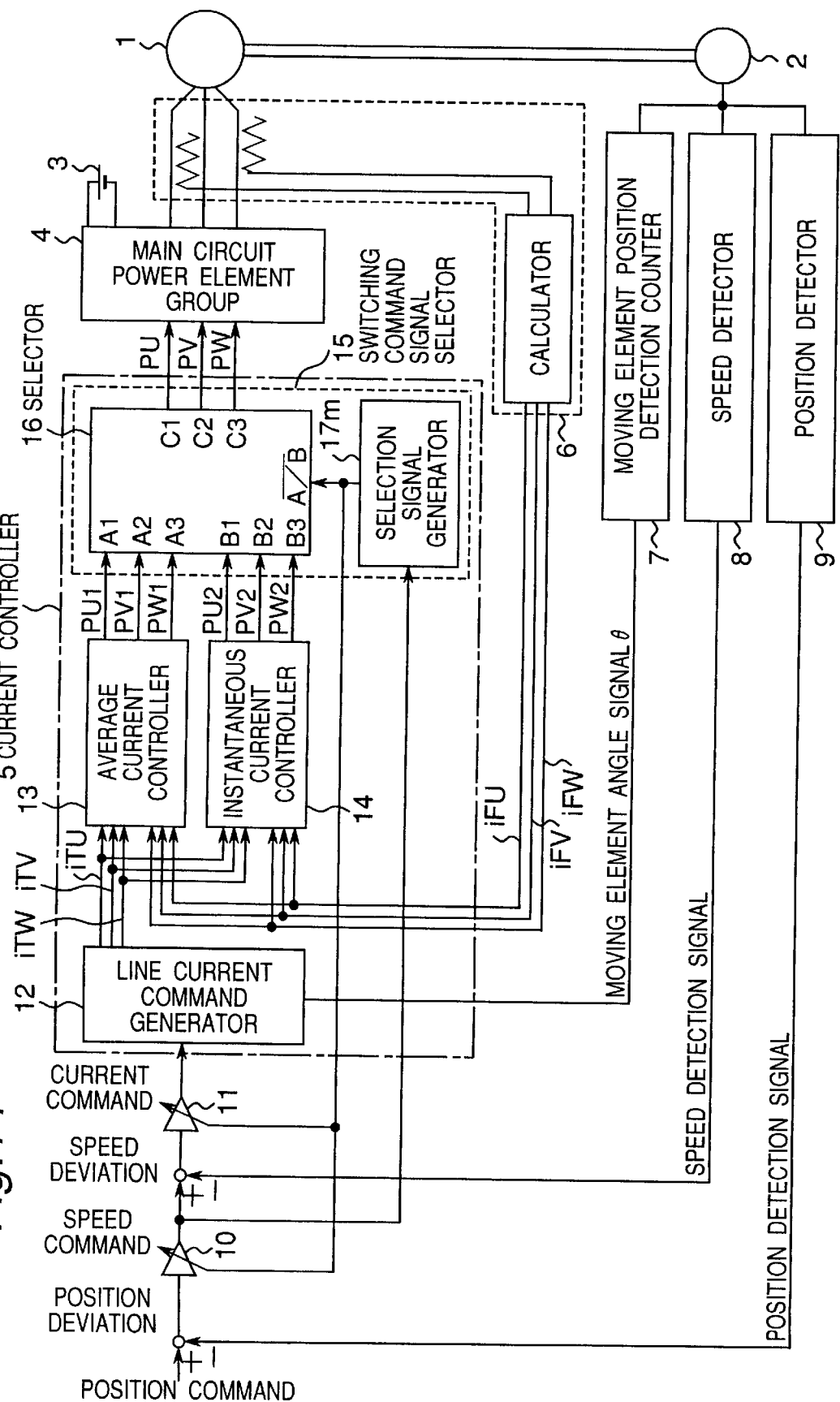
FIG. 14 is a schematic diagram of a motor control apparatus according to a fourth embodiment of the present invention.

A motor control apparatus according to a fourth preferred embodiment of the present invention is shown in FIG. 14.

Note that like parts in the embodiment shown in FIG. 14 and the second embodiment shown in FIG. 7 are identified by like reference numerals, and further description thereof is omitted below.

This motor control apparatus differs from the second embodiment in that the selection signal generator 17m switches between average current controller 13 and instantaneous current controller 14 based on a speed command rather than the speed detection signal. That is, when the speed command is within a range Ws4 near zero, the current control circuit is completed through average current controller 13; when not within this range Ws4, the current control circuit is completed through instantaneous current controller 14.

The benefits achieved by a motor control apparatus according to the second embodiment are also achieved by a motor control apparatus comprising this selection signal generator 17m.

Figure 16A:
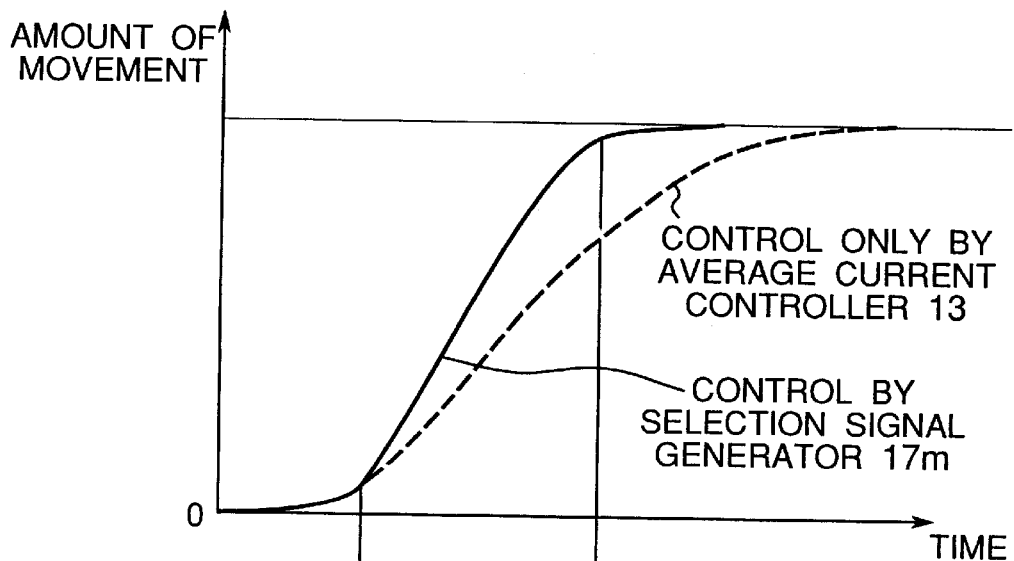
FIGS. 16A and 16B are graphs used to describe the operation of the motor control apparatus shown in FIG. 14.
Figure 16B:
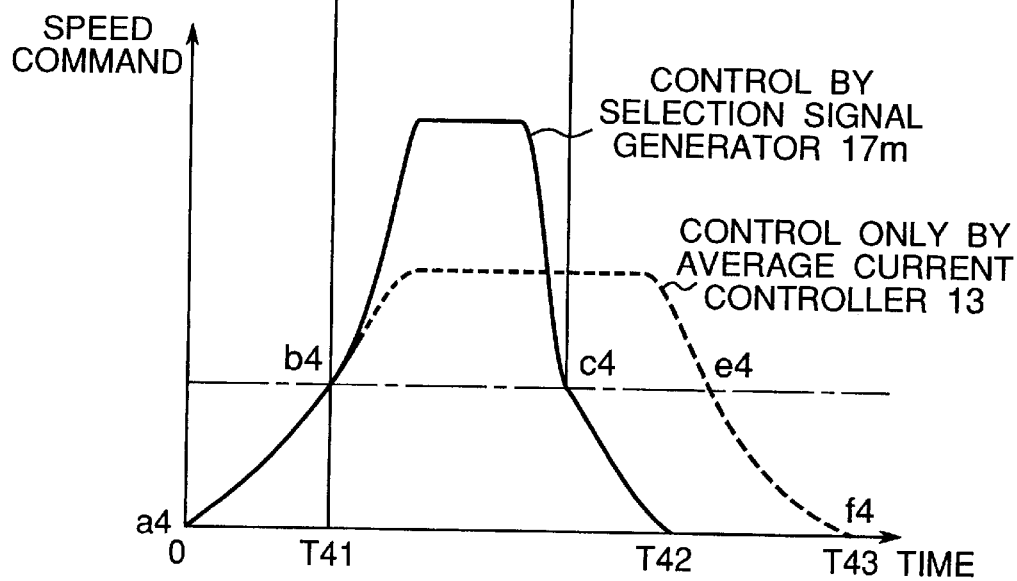

The operation of this embodiment is shown in FIGS. 16A and 16B. It will be noted that as with the second embodiment shown in FIG. 11, the response of a speed control circuit and positioning control circuit can also be increased, and positioning can thus be completed at high speed, by means of this preferred embodiment of the invention because a current control circuit is formed using an instantaneous current controller 14 having high gain and excellent response until the speed detection signal is brought within a range Ws4 near zero.

This preferred embodiment also achieves the following benefits by using a selection signal generator 17m to switch the current control circuit using a speed command.

That is, when the current control circuit is switched based on a speed detection signal as in the second embodiment, accurate speed detection is difficult because of digital quantization error near zero. This is because the speed detection signal is typically derived by digitally processing a pulse signal from a rotary encoder or other sensor 2. As a result, optimal current control circuit switching may not be possible.

A selection signal generator 17m according to this preferred embodiment switches the current control circuit using a speed command that is applied as a high resolution digital signal with less quantization error than a speed detection signal or analog signal. As a result, more optimally controlled switching is possible.

Figure 15:
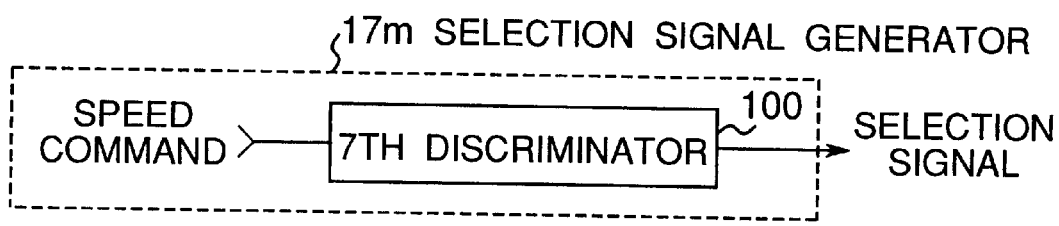
FIG. 15 shows the selection signal generator in the motor control apparatus shown in FIG. 14.
Figure 17A:
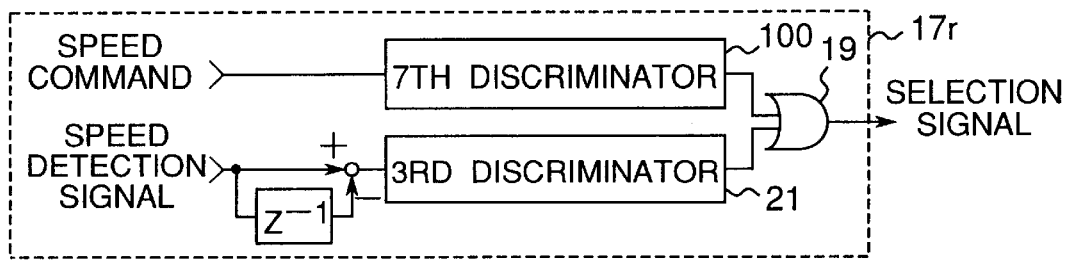
FIGS. 17A, 17B, 17C show alternative selection signal generators in the motor control apparatus shown in FIG. 14.
Figure 17B:
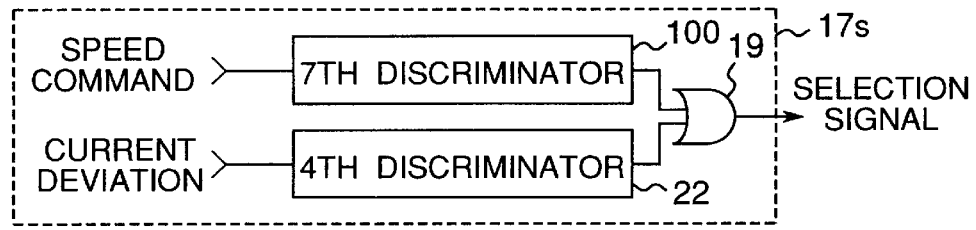
Figure 17C:
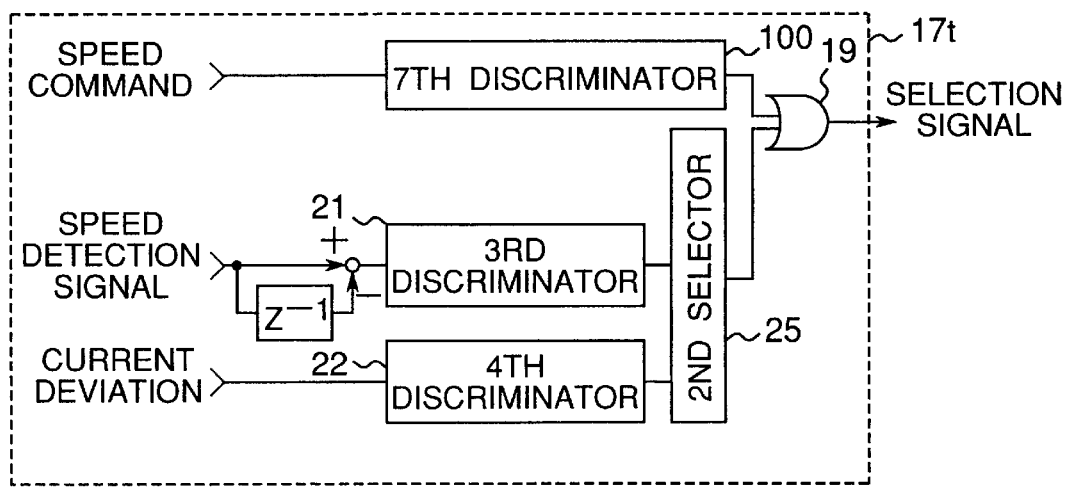

The selection signal generator 17m used in the above preferred embodiment as shown in FIG. 15 can be alternatively comprised as selection signal generator 17r, 17s, or 17t as shown in FIG. 17.

That is, while the above-noted selection signal generator 17m selects the average current controller 13 or instantaneous current controller 14 based on whether the speed command is within a specific range, the average current controller 13 and instantaneous current controller 14 can alternatively be selected using in addition to the speed command a detected speed change as per selection signal generator 17r; a current deviation as per selection signal generator 17s; or a combination of speed change and current deviation as per selection signal generator 17t.

In this case, as in the second embodiment above, positioning control response and noise suppression can be improved in the same manner achieved by using a selection signal generator 17e, 17f, 17g, or 17h.

In addition, it should be noted that selection signal generator 17r can detect deviation of the moving element from the position command position and switch to control using the instantaneous current controller 14 more quickly than can selection signal generator 17m, and selection signal generator 17s can perform this operation even more quickly than can selection signal generator 17r. As a result, it is possible to yet further improve the positioning control response and noise suppression effects described above. This is because signals further inside the control loop can respond more quickly to noise and position command changes.

It should be further noted that the second selector 25 in selection signal generator 17t outputs a combination of determination results based on the speed change and current deviation. It will be obvious to one with ordinary knowledge in the related art, however, that any type of signal processing operation can be applied to obtain the selection signal, including as necessary prioritizing these values, applying majority logic, and weighting.

It should also be noted that the third, fourth, and seventh discriminators 21, 22, and 100 of selection signal generators 17m, 17r, 17s, and 17t can also have hysteresis. When thus comprised it is possible to switch the current control circuit between the average current controller 13 and instantaneous current controller 14 without chattering, and stabilize motor behavior at the moment positioning is completed, even when the speed command, time change in the speed detection signal, or current deviation overshoot or undershoot at the moment positioning control is completed.

It will thus be obvious that a motor control apparatus according to this preferred embodiment achieves the same benefits as the second embodiment.

Embodiment 5

Figure 18:
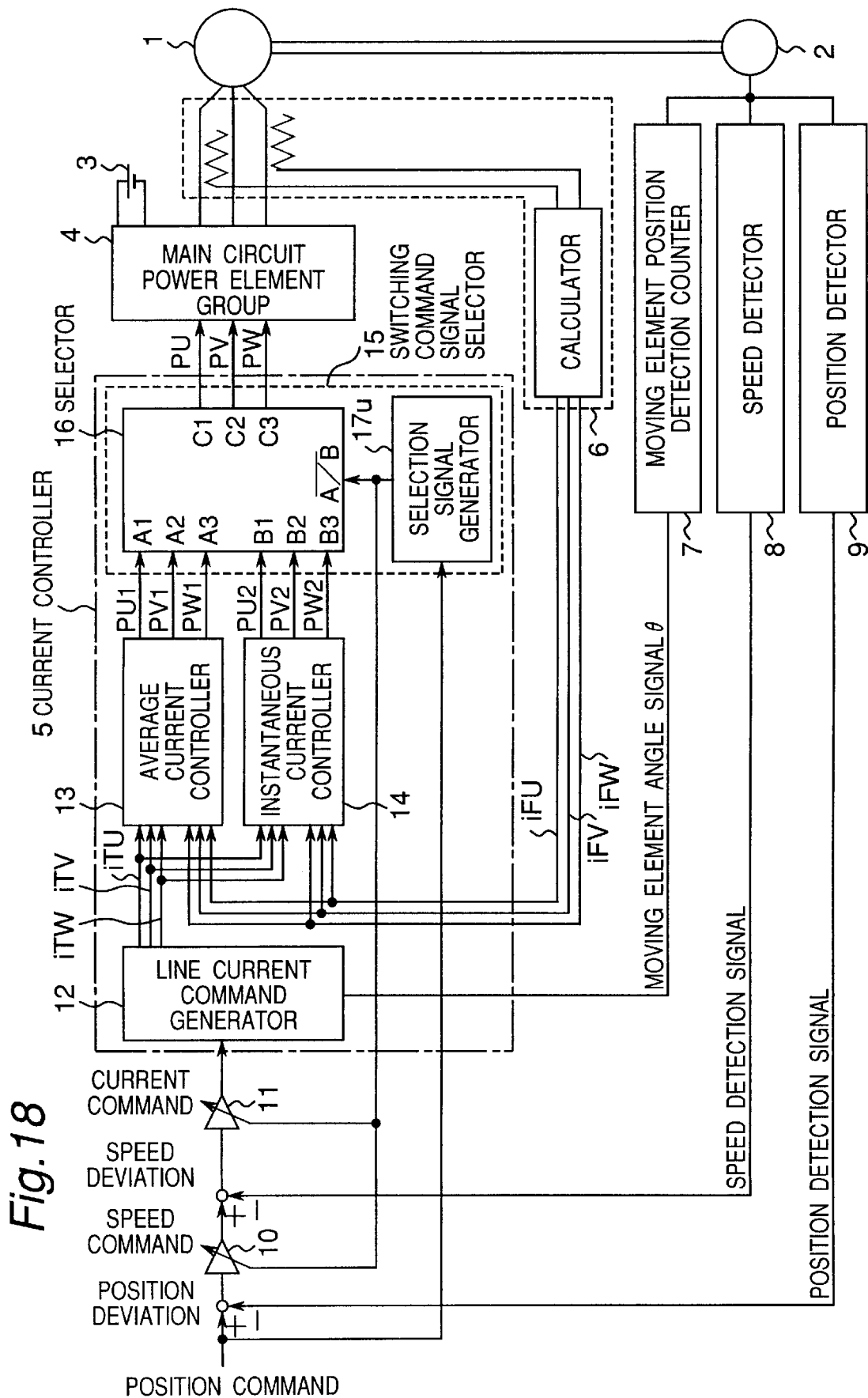
FIG. 18 is a schematic diagram of a motor control apparatus according to a fifth embodiment of the present invention.
Figure 19:
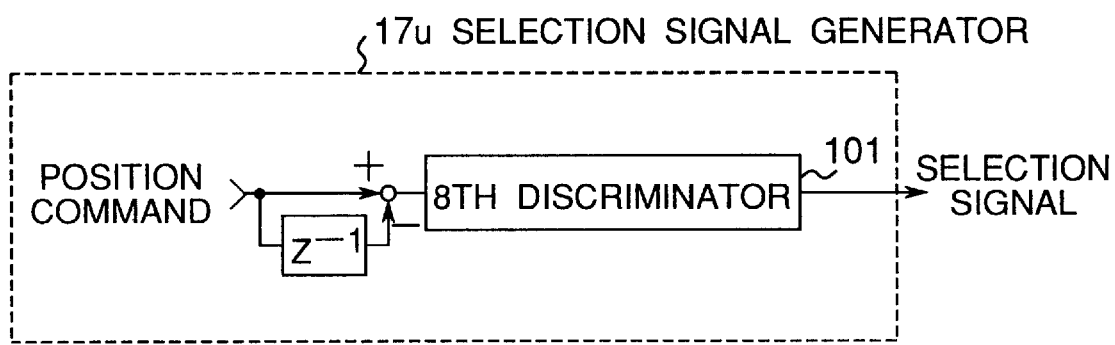
FIG. 19 shows the selection signal generator in the motor control apparatus shown in FIG. 18.

A motor control apparatus according to a fifth preferred embodiment of the present invention is shown in FIG. 18 and FIG. 19. Note that like parts in this embodiment and the first embodiment shown in FIG. 1 are identified by like reference numerals, and further description thereof is omitted below.

The motor control apparatus shown in FIG. 18 differs from the first embodiment in that selection signal generator 17 is replaced by selection signal generator 17u as shown in FIG. 19.

This selection signal generator 17u comprises an eighth discriminator 101 for determining whether the time change in the position command is within a specific range Wpr, and switches between the average current controller 13 and instantaneous current controller 14 based on the change over time in the position command. If the time change in the position command is not within this specific range Wpr, the selection signal generator 17u outputs the selection signal high; if within the range Wpr, it outputs the selection signal low.

Figure 20A:
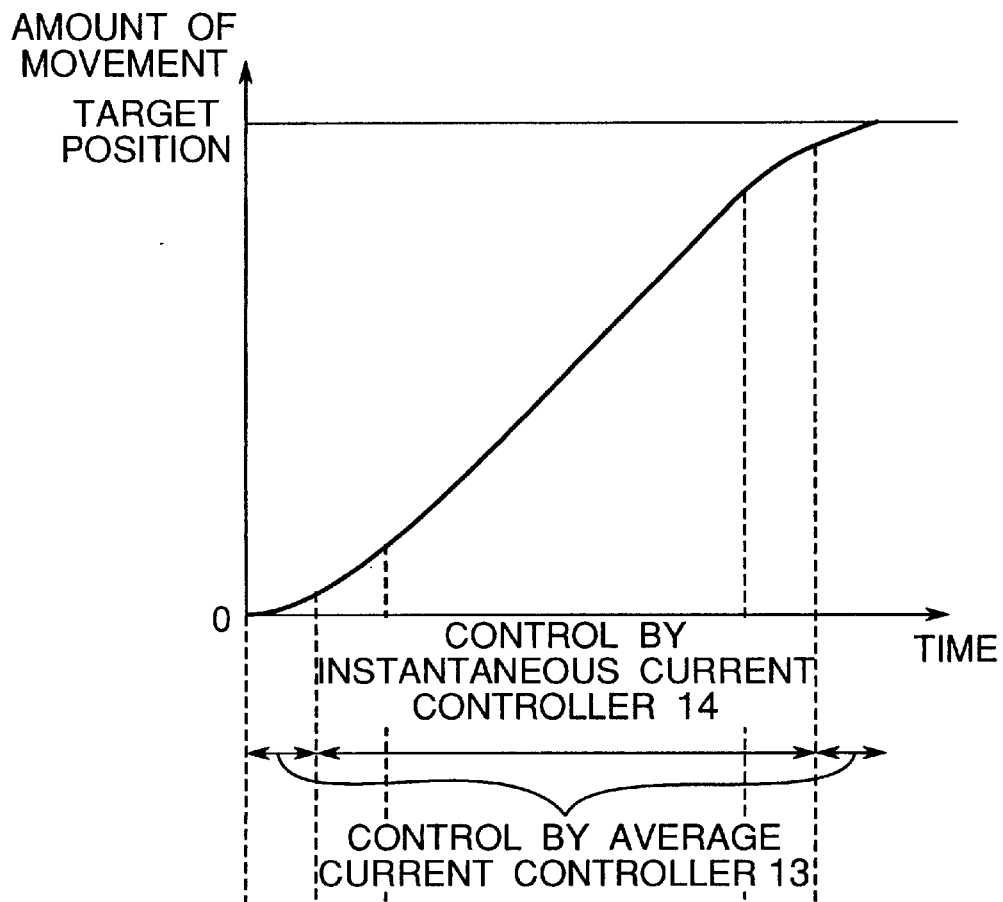
FIGS. 20A and 20B are graphs used to describe the operation of the motor control apparatus shown in FIG. 18.
Figure 20B:
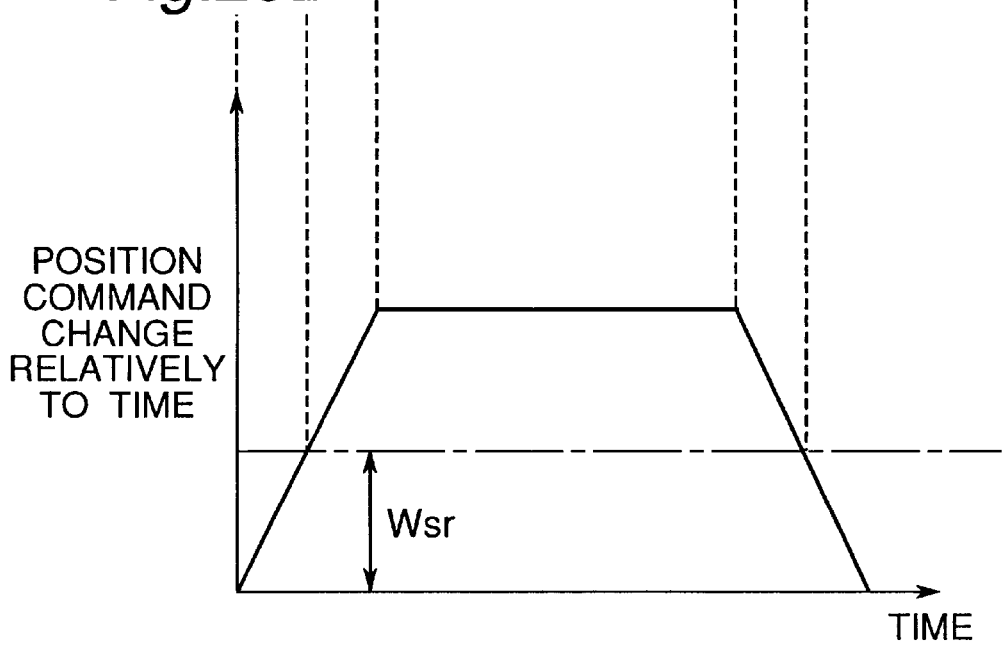

The operation of a motor control apparatus comprising a selection signal generator 17u according to this fifth embodiment is described next below with reference to FIGS. 20A and 20B.

In order to move the moving element of the motor, the position command begins with a signal level change having a particular temporal rate of change. If the change in the position command over time exceeds a specific range Wpr, the selection signal generator 17u causes the switching command signal selector 15 to select second switching command signals PU2, PV2, and PW2, and complete the current control circuit through instantaneous current controller 14.

The control circuit gain thus increases, and the positioning control response rises, as in the first embodiment. The moving element of the motor is thus controlled to closely track the time change in the position command.

When the position command approaches the level at which the moving element of the motor can be moved to the target position, the temporal rate of change in the position command gradually decreases until it settles to a level appropriate to the target position. When the change in the position command decreases to within the specific range Wpr at this time, the selection signal generator 17u instructs the switching command signal selector 15 to select the first switching command signals PU1, PV1 and PW1, and a current control circuit is completed through average current controller 13.

A motor control apparatus according to this preferred embodiment thus switches the current control circuit as described above to control positioning the moving element of a motor.

It should be noted that it is normal for the moving element of the motor to become momentarily unstable due to overshoot or undershoot immediately after the moving element reaches the position indicated by the position command.

Switching the current control circuit may therefore be unstable with a selection signal generator whereby the current control circuit is switched based on the position deviation as described in the first embodiment because position deviation can also vary unstably due to moving element overshoot or undershoot. As also noted above, however, this can be avoided by using discriminators having hysteresis.

A motor control apparatus achieving more stable current control circuit switching compared to the first embodiment of the present invention can thus be achieved by means of this preferred embodiment by which the current control circuit is switched based on the time change of the position command, which is not affected by the movement of the moving element.

Furthermore, positioning control response can also be improved because the current control circuit is formed using a high gain instantaneous current controller while the position command is changing, similarly to the first embodiment.

It will also be obvious that positioning control response can be further improved, and noise suppression can also be improved, by switching the current control circuit by additionally using signals inside the control loop relative to the position command, that is, position deviation, speed deviation, speed detection signal, and current deviation signals.

Embodiment 6

Figure 21:
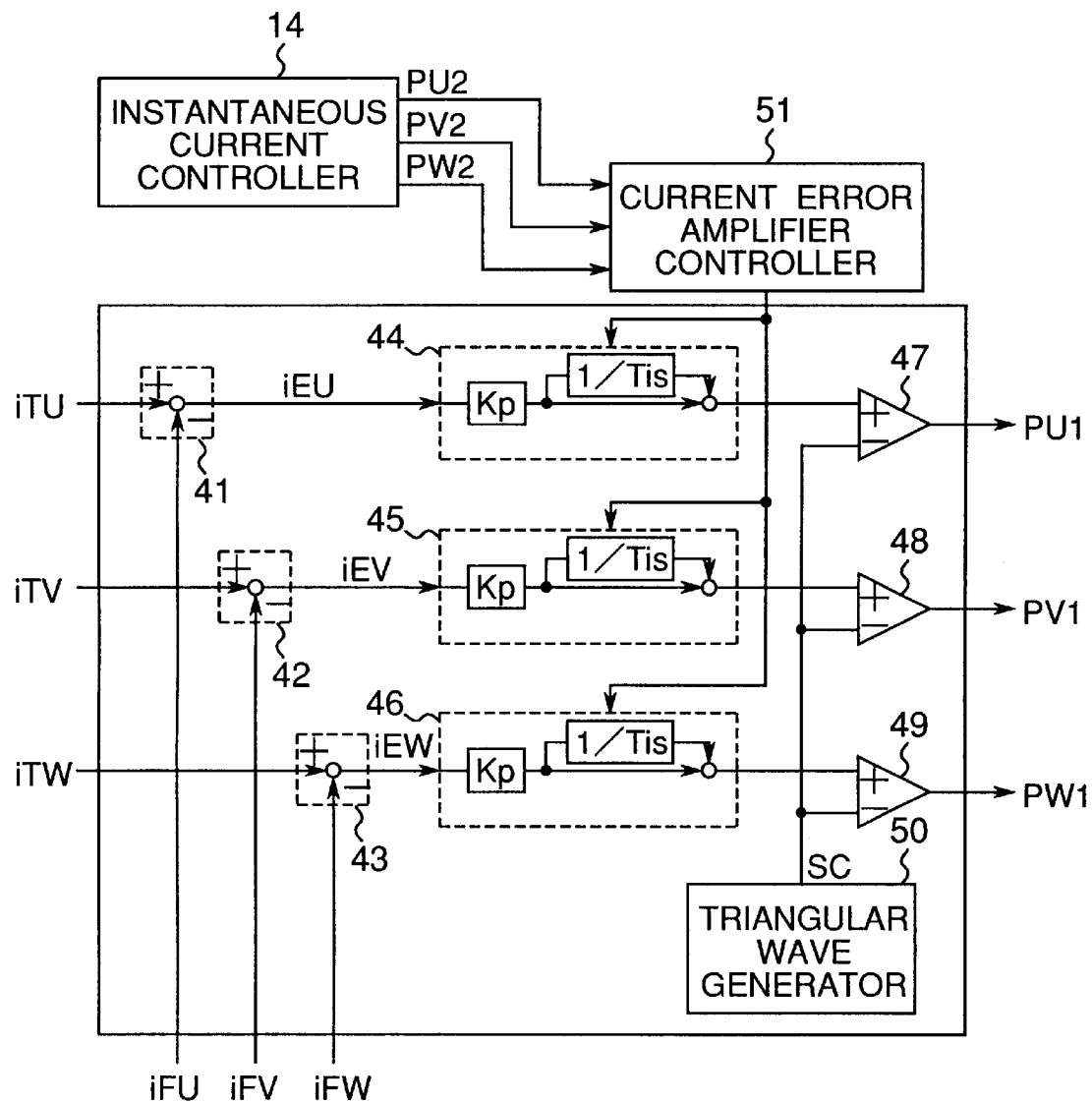
FIG. 21 is a schematic diagram of an average current controller according to the present invention.

A motor control apparatus according to a sixth embodiment of the present invention differs from the above first to fifth embodiments in using an average current controller 13 as shown in FIG. 21.

That is, the initial output values of the first, second, and third current error amplifiers 44, 45, and 46 of the average current controller 13 can be set by means of a current error amplifier controller 51 as described below.

The operation of a motor control apparatus thus comprised is described below.

The current error amplifier controller 51 shown in FIG. 21 obtains the values to be set as the proportional and integral of the first, second, and third current error amplifiers 44, 45, and 46 to set the initial output values of the current error amplifiers 44, 45, and 46 immediately before switching the current control circuit so that the first switching command signal output from the average current controller 13 immediately after the current control circuit is switched from the instantaneous current controller 14 to the average current controller 13 is the same as the second switching command signal output from the instantaneous current controller 14 immediately before the switch.

As a result of the current error amplifier controller 51 thus setting the initial output values of the current error amplifiers 44, 45, and 46, the voltage applied to the phase drive coils of the motor can be adjusted to the same values immediately before and after the current control circuit is switched from the instantaneous current controller 14 to the average current controller 13. As a result, the current control circuit can be smoothly switched.

The behavior of the motor when the current control circuit is switched can thus be stabilized, and a motor control apparatus with minimal vibration and noise can be achieved.

It should be noted that while the current error amplifier controller 51 of this embodiment is described setting both the proportional and integral of the current error amplifiers 44, 45, and 46, it is also possible to set only the integral.

That is, current error is normal during motor positioning, and this error is accumulated in the integral of the current error amplifiers 44, 45, and 46, resulting in a relatively high value. As a result, the output of the current error amplifiers 44, 45, and 46 is significantly more dependent on the value of the integral than the value of the proportional.

As a result, substantially the same practical effects are obtained whether the current error amplifier controller 51 sets only the integral, or sets both the integral and the proportional, of the current error amplifiers 44, 45, and 46.

Furthermore, the initial output value calculation procedure and signal processing operations can be simplified by setting only the integral. For example, when these calculation procedures and processes are run by a microprocessor or other computing device, the calculation time is reduced proportionately to the simplification of the process, thus improving the performance of the motor control apparatus.

Note that the values set as the initial output values of the current error amplifiers 44, 45, and 46 can be calculated as follows.

The voltage command whereby the first switching command signals PU1, PV1 and PW1 are output identically to the second switching command signals PU2, PV2, and PW2 from the instantaneous current controller 14 are first calculated, that is, the output values of the current error amplifiers 44, 45, and 46 are calculated first. These values and the current deviation, that is, the inputs to the current error amplifiers 44, 45, and 46, are then substituted in an equation for the transfer characteristic of the current error amplifiers (equation 1), and the above settings are obtained by a back calculation.

Embodiment 7

Figure 23:
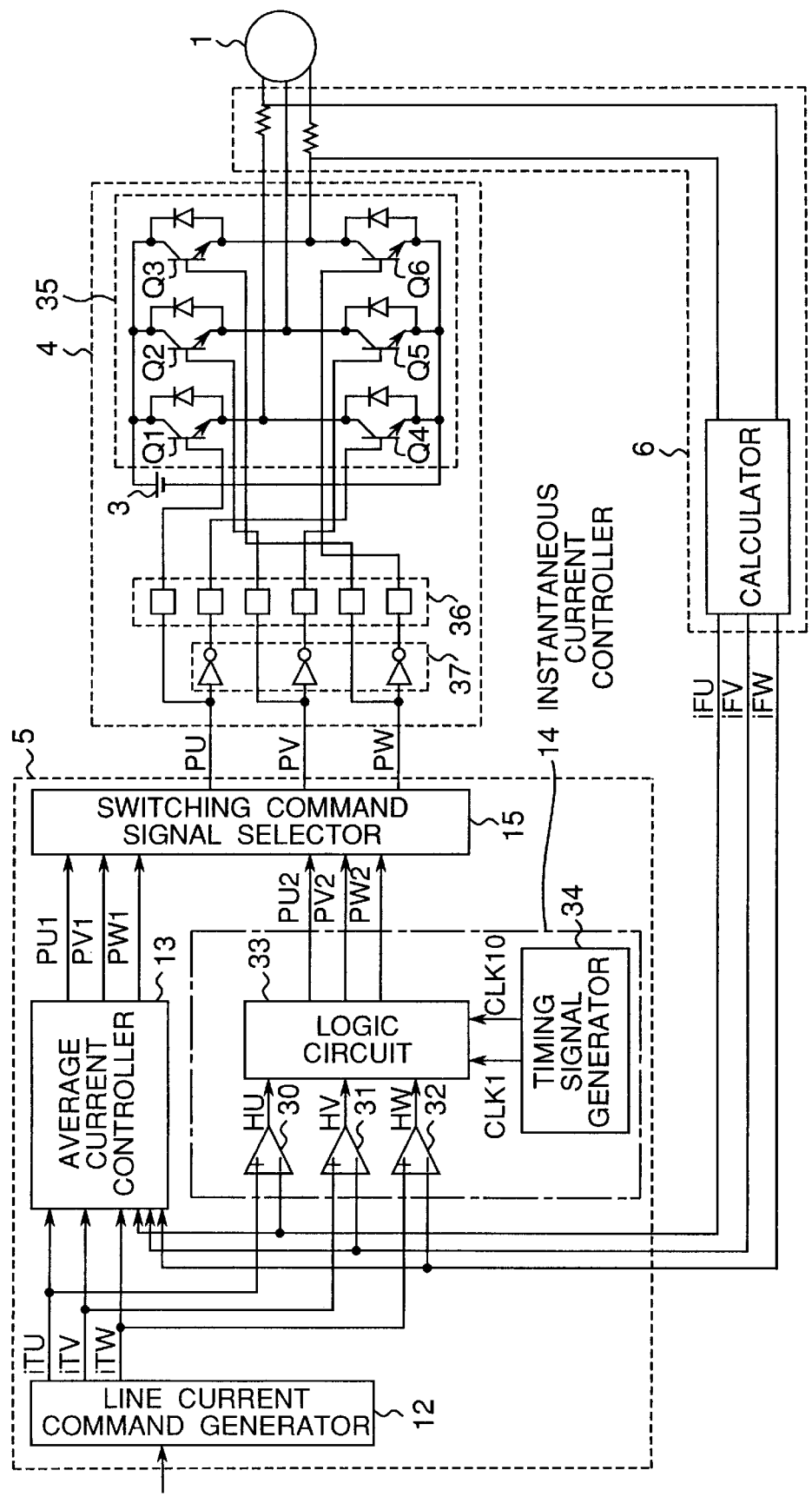
FIG. 23 is a schematic diagram of a motor control apparatus comprising an instantaneous current controller according to the present invention.

A motor control apparatus according to a seventh embodiment of the present invention differs from the above first to fifth embodiments in using a main circuit power element group 4 and instantaneous current controller 14 as shown in FIG. 23. A motor control apparatus according to this preferred embodiment is described in detail below with reference to FIG. 23. It should be noted that like parts in this embodiment and embodiments 1 to 5 are identified by like reference numerals, and further description thereof is omitted below where the description focuses on the main circuit power element group 4 and instantaneous current controller 14.

As shown in FIG. 23, this main circuit power element group 4 comprises: a first main circuit switching power element Q1 connected to the positive terminal of main circuit dc source 3 for supplying first line current IU to three-phase motor 1; a second main circuit switching power element Q2 connected to the positive terminal of main circuit dc source 3 for supplying second line current IV to the three-phase motor 1; a third main circuit switching power element Q3 connected to the positive terminal of main circuit dc source 3 for supplying third line current IW to the three-phase motor 1; a fourth main circuit switching power element Q4 connected to the negative terminal of main circuit dc source 3 for supplying first line current IU to three-phase motor 1; a fifth main circuit switching power element Q5 connected to the negative terminal of main circuit dc source 3 for supplying second line current IV to the three-phase motor 1; a sixth main circuit switching power element Q6 connected to the negative terminal of main circuit dc source 3 for supplying third line current IW to the three-phase motor 1; a three-phase bridge 35 comprising a plurality of recirculating diodes parallel connected to the main circuit switching power elements; a plurality of logic inverters 37; and base drive means 36. Thus comprised, the base drive means 36 and logic inverters 37 work together to turn on either first main circuit switching power element Q1 or fourth main circuit switching power element Q4 in response to switching command signal PU, either second main circuit switching power element Q2 or fifth main circuit switching power element Q5 in response to switching command signal PV, and third main circuit switching power element Q3 or sixth main circuit switching power element Q6 in response to switching command signal PW.

More specifically, when switching command signal PU goes high, first main circuit switching power element Q1 goes on; when low, fourth main circuit switching power element Q4 goes on. When switching command signal PV goes high, second main circuit switching power element Q2 goes on; when low, fifth main circuit switching power element Q5 goes on. Likewise, when switching command signal PW goes high, third main circuit switching power element Q3 goes on; when low, sixth main circuit switching power element Q6 goes on.

The instantaneous current controller 14 comprises first, second, and third comparators 30, 31, and 32 for comparing first, second, and third line current commands iTU, iTV, and iTW and first, second, and third line current measurements iFU, iFV, and iFW; logic circuit 33 for outputting second switching command signals PU2, PV2, and PW2 based on the comparator outputs; and timing signal generator 34 for generating a timing signal controlling the timing of logic circuit 33 operation.

Commands iTU, iTV, and iTW are applied to the inverting inputs of first, second, and third comparators 30, 31, and 32, and the first, second, and third line current measurements iFU, iFV, and iFW are applied to the noninverting inputs. The comparators output, respectively, first, second, and third line current comparisons HU, HV, and HW.

Note that for convenience only below, the first, second, and third line current comparisons HU, HV, and HW are assumed to be high when the line current measurement is high relative to the line current command value, and low when the line current measurement is low relative to the command value.

The first, second, and third line current comparisons HU, HV, and HW, and update timing signal CLK from the timing signal generator 34, are applied to the logic circuit 33. The logic circuit 33 then outputs the second switching command signals PU2, PV2, and PW2 controlling the on/off state of the main circuit switching power elements Q1 to Q6.

At the rising edge of update timing signal CLK10, the logic circuit 33 changes the on/off states based on the first, second, and third line current comparisons HU, HV, and HW, and outputs the second switching command signals PU2, PV2, and PW2. Then, based on a change in the signal level of first, second, and third line current comparisons HU, HV, and HW, the logic circuit 33 changes the second switching command signals PU2, PV2, and PW2.

A truth table for logic circuit 33 operation is shown in Table 1 below. The operation of logic circuit 33 is described below with reference to Table 1.

TABLE 1

| State No. | Reset Signal RESET | State Update Timing Signal CLK1O | Line Current Comparison | | | Switching Command Signal | | |
|---|---|---|---|---|---|---|---|---|
| | | | HU | HV | HW | PU | PV | PW |
| A00 | L | ↑ | L | H | H | H | L | L |
| AX1 | L | ♦ | * | L | H | H | H | L |
| AX2 | L | ♦ | * | L | L | H | H | H |
| A00 | L | ↑ | L | H | H | H | L | L |
| AY1 | L | ♦ | * | H | L | H | L | H |
| AY2 | L | ♦ | * | L | L | H | H | H |

TABLE 1-continued

| State No. | Reset Signal RESET | State Update Timing Signal CLK1O | Line Current Comparison | | | Switching Command Signal | | |
|---|---|---|---|---|---|---|---|---|
| | | | HU | HV | HW | PU | PV | PW |
| B00 | L | ↑ | H | L | H | L | H | L |
| BX1 | L | ♦ | L | * | H | H | H | L |
| BX2 | L | ♦ | L | * | L | H | H | H |
| B00 | L | ↑ | H | L | H | L | H | L |
| BY1 | L | ♦ | H | * | L | L | H | H |
| BY2 | L | ♦ | L | * | L | H | H | H |
| C00 | L | ↑ | H | H | L | L | L | H |
| CX1 | L | ♦ | L | H | * | H | L | H |
| CX2 | L | ♦ | L | L | * | H | H | H |
| C00 | L | ↑ | H | H | L | L | L | H |
| CY1 | L | ♦ | H | L | * | L | H | H |
| CY2 | L | ♦ | L | L | * | H | H | H |
| D00 | L | ↑ | H | L | L | L | H | H |
| DX1 | L | ♦ | * | H | L | L | L | H |
| DX2 | L | ♦ | * | H | H | L | L | L |
| D00 | L | ↑ | H | L | L | L | H | H |
| DY1 | L | ♦ | * | L | H | L | H | L |
| DY2 | L | ♦ | * | H | H | L | L | L |
| E00 | L | ↑ | L | H | L | H | L | H |
| EX1 | L | ♦ | H | * | L | L | L | H |
| EX2 | L | ♦ | H | * | H | L | L | L |
| E00 | L | ↑ | L | H | L | H | L | H |
| EY1 | L | ♦ | L | * | H | H | L | L |
| EY2 | L | ♦ | H | * | H | L | L | L |
| F00 | L | ↑ | L | L | H | H | H | L |
| FX1 | L | ♦ | H | L | * | L | H | L |
| FX2 | L | ♦ | H | H | * | L | L | L |
| F00 | L | ↑ | L | L | H | H | H | L |
| FY1 | L | ♦ | L | H | * | H | L | L |
| FY2 | L | ♦ | H | H | * | L | L | L |
| G00 | L | ↑ | H | H | H | L | L | L |
| H00 | L | ↑ | L | L | L | H | H | H |
| CLR | L | ♦ | * | * | * | L | L | L |

How to read Table 1 is described below.

The state number (No.; A00, AX1, AX2, A00, AY1, AY2, B00, BX1, etc.) in Table 1 indicates the I/O state of the logic circuit 33; an up arrow (↑) symbol indicates the rising edge timing of the update timing signal CLK10; a solid diamond (♦) indicates a stable high or low level state. An asterisk (*) indicates "don't care" for the line current comparison, that is, that line current comparison can be either high or low as it has no affect on operation. H indicates a high level, and L indicates a low level.

The reset signal RESET is an input signal for initializing the logic circuit 33, and is normally low. When reset signal RESET goes high, the logic circuit 33 is immediately reinitialized.

The operation of logic circuit 33 is described next with reference to Table 1. At the rising edge of update timing signal CLK10, the eight states indicated at A00, B00, C00, D00, E00, F00, G00, H00 are set based on the levels of the first, second, and third line current comparisons HU, HV, and HW. The eight state numbers are indicated by the letters A to H. For convenience below, the places in these state numbers are referenced from the left as the first, second, and third digits such that in A00, for example, A is the first digit.

A change to state No. A00, B00, C00, D00, E00, or F00 is considered below.

When there is a change to one of these states, two of the first, second, and third line current comparison HU, HV, and HW signals will be the same level at the rising edge of the update timing signal CLK10. Subsequent operation then changes according to which of these two same-level signals changed first (indicated by the second digit of the state numbers, represented as X and Y).

For example, if at state A00 the second line current comparison HV changes first, state AX1 is assumed; if third line current comparison HW changes first, state AY1 is assumed.

Then, if of these two same-level signals the signal that did not change first changes, the state indicated by the state number with the same two first digits and a "2" in the third digit is assumed.

For example, if in state AX1, state AX2 is assumed; if AY1, AY2 is assumed.

This state is then held until the timing indicated by the next rising edge of the update timing signal CLK10.

When state number G00 or H00 is finally assumed at the rising edge of update timing signal CLK10, the selected state is held until the next rising edge of the update timing signal CLK10 is detected. As a result, output of second switching command signals PU2, PV2, and PW2 continues at the same level.

The operation of the logic circuit 33 is described next with reference to the truth table in Table 1.

Operation at the rising edge of the update timing signal CLK10 is described first.

The logic circuit 33 reads the signal levels of first, second, and third line current comparisons HU, HV, and HW at the rising edge of update timing signal CLK10, and determines the output signal levels of second switching command signals PU2, PV2, and PW2 causing the first, second, and third line current measurements iFU, iFV, and iFW to approach the first, second, and third line current commands iTU, iTV, and iTW. The result of this is to match the line current measurements iFU, iFV, and iFW to the line current commands. As a result, the PU2, PV2, and PW2 signal levels are the inverse of the HU, HV, and HW signal levels. For example, if HU is high, PU2 is low; if HU is low, PU2 is high. The same is true for PV2 and PW2.

Operation of the logic circuit 33 between the rising edges of update timing signal CLK10, that is, from detection of one rising edge to detection of the next rising edge, is described next.

Operation during this period is determined by the HU, HV, and HW signal levels at the rising edge of update timing signal CLK10.

Operation differs according to whether two of the three signals HU, HV, and HW have the same signal level, or all three have the same signal level. That is, operation depends upon whether:

HU, HV, HW=(L, H, H)
or (H, L, H)
or (H, H, L)
or (H, L, L)
or (L, H, L)
or (L, L, H)
or whether
HU, HV, HW (H, H, H)
or (L, L, L).

Operation when one signal level differs from the other two is described first below.

It is self evident that the inverse of the polarity of the sum of two of three line currents will be the value of the third line current in a three-phase motor 1. The logic circuit 33 in this preferred embodiment of the invention therefore focuses on the two HU, HV, and HW signals having the same signal level at the rising edge of update timing signal CLK10 to determine the levels of the second switching command signals PU2, PV2, and PW2 such that the main circuit switching power elements supplying the line currents associated with these two same-level signals are appropriately switched on or off.

More specifically, if the main circuit switching power element supplying the line current associated with the same-level signal that inverts first is on, the level of the switching command signal for the associated main circuit switching power element is inverted such that the power element goes off; if off, the switching command signal is inverted to that the power element goes on.

When the level of the other same-level signal then inverts, the switching command signal controlling the associated power element is likewise switched such that an on power element goes off, and an off element goes on.

At this point the second switching command signals PU2, PV2, and PW2 output from the logic circuit 33 will all be the same level, matching the level of the one HU, HV, and HW signal that differed from the other two signals at the rising edge of update timing signal CLK10. The second switching command signals PU2, PV2, and PW2 are then held at this level until the next rising edge of update timing signal CLK10. The same operation is then repeated at the next rising edge of update timing signal CLK10.

Operation when all three HU, HV, and HW signals are at the same level at the rising edge of update timing signal CLK10 is described next.

When all three HU, HV, and HW signals are the same level, the second switching command signals PU2, PV2, and PW2 are held at the signal level determined at the rising edge of update timing signal CLK10 until the next rising edge of update timing signal CLK10 is detected.

This completes the description of instantaneous current controller 14 operation.

Referring next to FIGS. 24A, 24B and 24C, line current control using instantaneous current controller 14 according to this preferred embodiment of the invention is described below.

FIG. 24A is a waveform diagram showing the first, second, and third line current commands iTU, iTV, and iTW and the first, second, and third line current measurements iFU, iFV, and iFW; FIG. 24B is used to describe the operation of logic circuit 33 in the area enclosed in a dotted line in FIG. 24A; and FIG. 24C shows the on/off operation of first to sixth main circuit switching power elements Q1 to Q6 based on the switching command signals PU, PV, and PW output from the logic circuit 33.

Operation at time t=t1, that is, at the rising edge of update timing signal CLK10, is described first.

When line current commands iTU, iTV, and iTW and measurements iFU, iFV, and iFW are in the following relationship at time t=t1 (at the rising edge of update timing signal CLK10):

iTU>iFU
iTV<iFV
iTW<iFW the signal levels of first, second, and third line current comparisons HU, HV, and HW are:

(HU, HV, HW)=(L, H, H).

This state corresponds to state number A00 in the above truth table (Table 1), and the switching command signals PU, PV, and PW output from logic circuit 33 to main circuit power element group 4 are thus:

(PU, PV, PW)=(H, L, L).

The main circuit switching power elements Q1 to Q6 thus become ON, OFF, OFF, OFF, ON, ON, respectively, and the line current measurements iFU, iFV, and iFW approach the line current commands iTU, iTV, and iTW according to the electrical time constants of the three-phase motor 1.

This completes the description of the current control operation of this instantaneous current controller 14 at the rising edge of update timing signal CLK10 at time t=t1.

Next is described operation at time t=t11 at which iTV>iFV, and (HU, HV, HW)=(L, H, H) changes to:

(HU, HV, HW)=(*, L, H)

where an asterisk (*) indicates "don't care", that is, the corresponding signal level (HU in this case) is ignored. (Note that an asterisk hereafter means that the signal level is ignored.)

These first, second, and third line current comparisons HU, HV, and HW are applied to the logic circuit 33, which changes the levels of switching command signals PU, PV, and PW from:

(PU, PV, PW)=(H, L, L)

to (PU, PV, PW)=(H, H, L).

Main circuit switching power element Q2 thus switches on, and Q5 switches off (entering state AX1).

This completes the description of current control operation at time t=t11.

Next is described operation at time t=t12 at which iTW>iFW, and (HU, HV, HW)=(*, L, H) changes to:

(HU, HV, HW)=(*, H, H)

These first, second, and third line current comparisons HU, HV, and HW are applied to the logic circuit 33, which changes the levels of switching command signals PU, PV, and PW from:

(PU, PV, PW)=(H, H, L)

to (PU, PV, PW)=(H, H, H).

Main circuit switching power element Q3 thus switches on, and Q6 switches off (entering state AX2).

This completes the description of current control operation at time t=t12.

This (PU, PV, PW)=(H, H, H) state is then held until the next rising edge of update timing signal CLK10.

The line currents of three-phase motor 1 can thus be controlled to track the first, second, and third line current commands iTU, iTV, and iTW by thereafter repeating the above operation at the next rising edge of update timing signal CLK10.

This completes the description of the current control operation of an instantaneous current controller 14 according to this preferred embodiment of the invention.

Figure 22:
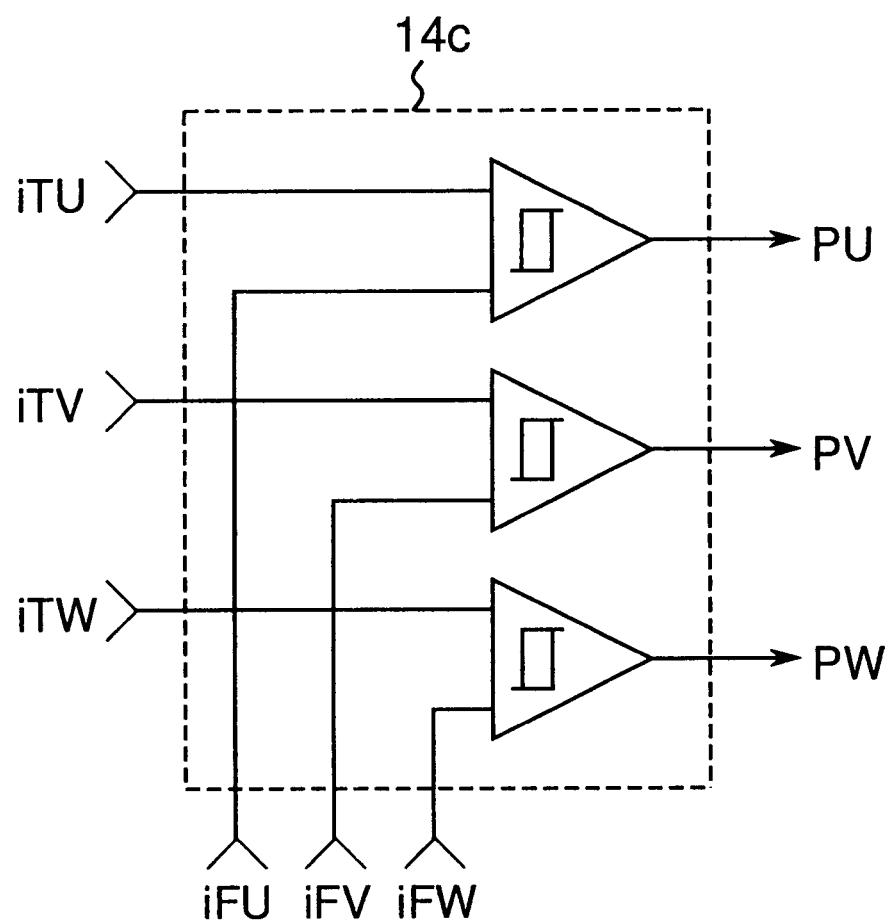
FIG. 22 is a schematic diagram of a common instantaneous current controller using a hysteresis comparator.

It should be noted that a common alternative instantaneous current controller 14 uses a hysteresis comparator as shown in FIG. 22, 14c. It will be obvious to one with ordinary knowledge of the related art that the same benefits described in the first to fifth embodiments above can also be achieved using a hysteresis comparator in the instantaneous current controller.

However, when current is controlled using an instantaneous current controller 14c having a hysteresis comparator, the second switching command signals PU2, PV2, and PW2 are obtained by a simple comparison of the line current command signals and line current measurements. As a result, the second switching command signals PU2, PV2, and PW2 do not switch high and low with regular timing.

When the main circuit power element group 4 is controlled using such irregular signals for the switching command signals PU, PV, and PW, the switching frequency of the main circuit switching power elements Q1 to Q6 is not constant, and operation is unstable. This results in an increase in motor noise. When the switching frequency becomes too high, there is an increase in power element Q1 to Q6 switching loss. In a worst case scenario, this can result in device failure.

When current is controlled with an instantaneous current controller 14 as shown in FIG. 23 according to this preferred embodiment, however, the timing at which the main circuit switching power elements switch can be controlled using the update timing signal as described above, and the switching frequency of the power elements Q1 to Q6 can be stabilized (power elements can be switched twice between updating timings, that is, at the update timing and a change in the line current comparison signal).

As a result, power element switching can be stabilized, motor noise can be suppressed, and concern about device failure is eliminated because there is no increase in power element Q1 to Q6 switching loss. The problems associated with using a hysteresis comparator as shown in FIG. 22 are thus eliminated.

It should also be noted that the logic circuit 33 in instantaneous current controller 14 can be alternatively comprised to operate according to truth Table 2.

TABLE 2

| State No. | Reset Signal RESET | State Update Timing Signal CLK1O | Line Current Comparison | | | Switching Command Signal | | |
|---|---|---|---|---|---|---|---|---|
| | | | HU | HV | HW | PU | PV | PW |
| A00 | L | ↑ | L | H | H | H | L | L |
| AX1 | L | ◆ | * | L | H | H | H | L |
| AX2 | L | ◆ | * | L | L | L | L | L |
| A00 | L | ↑ | L | H | H | H | L | L |
| AY1 | L | ◆ | * | H | L | H | L | H |
| AY2 | L | ◆ | * | L | L | L | L | L |
| B00 | L | ↑ | H | L | H | L | H | L |
| BX1 | L | ◆ | L | * | H | H | H | L |
| BX2 | L | ◆ | L | * | L | L | L | L |
| B00 | L | ↑ | H | L | H | L | H | L |
| BY1 | L | ◆ | H | * | L | L | H | H |
| BY2 | L | ◆ | L | * | L | L | L | L |
| C00 | L | ↑ | H | H | L | L | L | H |
| CX1 | L | ◆ | L | H | * | H | L | H |
| CX2 | L | ◆ | L | L | * | L | L | L |
| C00 | L | ↑ | H | H | L | L | L | H |
| CY1 | L | ◆ | H | L | * | L | H | H |
| CY2 | L | ◆ | L | L | * | L | L | L |
| D00 | L | ↑ | H | L | L | L | H | H |
| DX1 | L | ◆ | * | H | L | L | L | H |
| DX2 | L | ◆ | * | H | H | H | H | H |
| D00 | L | ↑ | H | L | L | L | H | H |
| DY1 | L | ◆ | * | L | H | L | H | L |
| DY2 | L | ◆ | * | H | H | H | H | H |
| E00 | L | ↑ | L | H | L | H | L | H |
| EX1 | L | ◆ | H | * | L | L | L | H |
| EX2 | L | ◆ | H | * | H | H | H | H |
| E00 | L | ↑ | L | H | L | H | L | H |
| EY1 | L | ◆ | L | * | H | H | L | L |
| EY2 | L | ◆ | H | * | H | H | H | H |
| F00 | L | ↑ | L | L | H | H | H | L |
| FX1 | L | ◆ | H | L | * | L | H | L |
| FX2 | L | ◆ | H | H | * | H | H | H |
| F00 | L | ↑ | L | L | H | H | H | L |
| FY1 | L | ◆ | L | H | * | H | L | L |
| FY2 | L | ◆ | H | H | * | H | H | H |
| G00 | L | ↑ | H | H | H | L | L | L |
| H00 | L | ↑ | L | L | L | H | H | H |
| CLR | L | ◆ | * | * | * | L | L | L |

In this case, the states of the second switching command signals PU2, PV2, and PW2 are adjusted so that the main circuit switching power element on the voltage side opposite that indicated by truth Table 1 goes on when in the state determined by the third digit in the state number.

The voltages applied to the phase drive coils of the three-phase motor 1 are the same whether truth Table 1 or truth Table 2 is used to control power element switching. Operation and the resulting benefits are the same as when the logic circuit 33 outputs the switching command signals based on truth Table 1.

It should be yet further noted that the logic circuit 33 can be alternatively comprised to operate according to the following truth Table 3.

TABLE 3

| State No. | Reset Signal RESET | State Update Timing Signal CLK1O | Line Current Comparison | | | Switching Command Signal | | |
|---|---|---|---|---|---|---|---|---|
| | | | HU | HV | HW | PU | PV | PW |
| AOO | L | ↑ | L | H | H | H | L | L |
| AX1 | L | ◆ | * | L | H | H | H | L |
| AX2 | L | ◆ | * | L | L | L | L | L |
| AOO | L | ↑ | L | H | H | H | L | L |
| AY1 | L | ◆ | * | H | L | H | L | H |
| AY2 | L | ◆ | * | L | L | L | L | L |
| BOO | L | ↑ | H | L | H | L | H | L |
| BX1 | L | ◆ | L | * | H | H | H | L |
| BX2 | L | ◆ | L | * | L | L | L | L |
| BOO | L | ↑ | H | L | H | L | H | L |
| BY1 | L | ◆ | H | * | L | L | H | H |
| BY2 | L | ◆ | L | * | L | L | L | L |
| COO | L | ↑ | H | H | L | L | L | H |
| CX1 | L | ◆ | L | H | * | H | L | H |
| CX2 | L | ◆ | L | L | * | L | L | L |
| COO | L | ↑ | H | H | L | L | L | H |
| CY1 | L | ◆ | H | L | * | L | H | H |
| CY2 | L | ◆ | L | L | * | L | L | L |
| DOO | L | ↑ | H | L | L | L | H | H |
| DX1 | L | ◆ | * | H | L | L | L | H |
| DX2 | L | ◆ | * | H | H | L | L | L |
| DOO | L | ↑ | H | L | L | L | H | H |
| DY1 | L | ◆ | * | L | H | L | H | L |
| DY2 | L | ◆ | * | H | H | L | L | L |
| EOO | L | ↑ | L | H | L | H | L | H |
| EX1 | L | ◆ | H | * | L | L | L | H |
| EX2 | L | ◆ | H | * | H | L | L | L |
| EOO | L | ↑ | L | H | L | H | L | H |
| EY1 | L | ◆ | L | * | H | H | L | L |
| EY2 | L | ◆ | H | * | H | L | L | L |
| FOO | L | ↑ | L | L | H | H | H | L |
| FX1 | L | ◆ | H | L | * | L | H | L |
| FX2 | L | ◆ | H | H | * | L | L | L |
| FOO | L | ↑ | L | L | H | H | H | L |
| FY1 | L | ◆ | L | H | * | H | L | L |
| FY2 | L | ◆ | H | H | * | L | L | L |
| GOO | L | ↑ | H | H | H | L | L | L |
| HOO | L | ↑ | L | L | L | L | L | L |
| CLR | L | ◆ | * | * | * | L | L | L |

In this case, the second switching command signals PU2, PV2, and PW2 are all low (L, L, L) when in the state determined by the third digit in the state number.

The voltages applied to the phase drive coils of the three-phase motor 1 are again the same as when truth Table 1 is used to control power element switching. Operation and the resulting benefits are therefore also the same as when the logic circuit 33 outputs the switching command signals based on truth Table 1.

Figure 25:
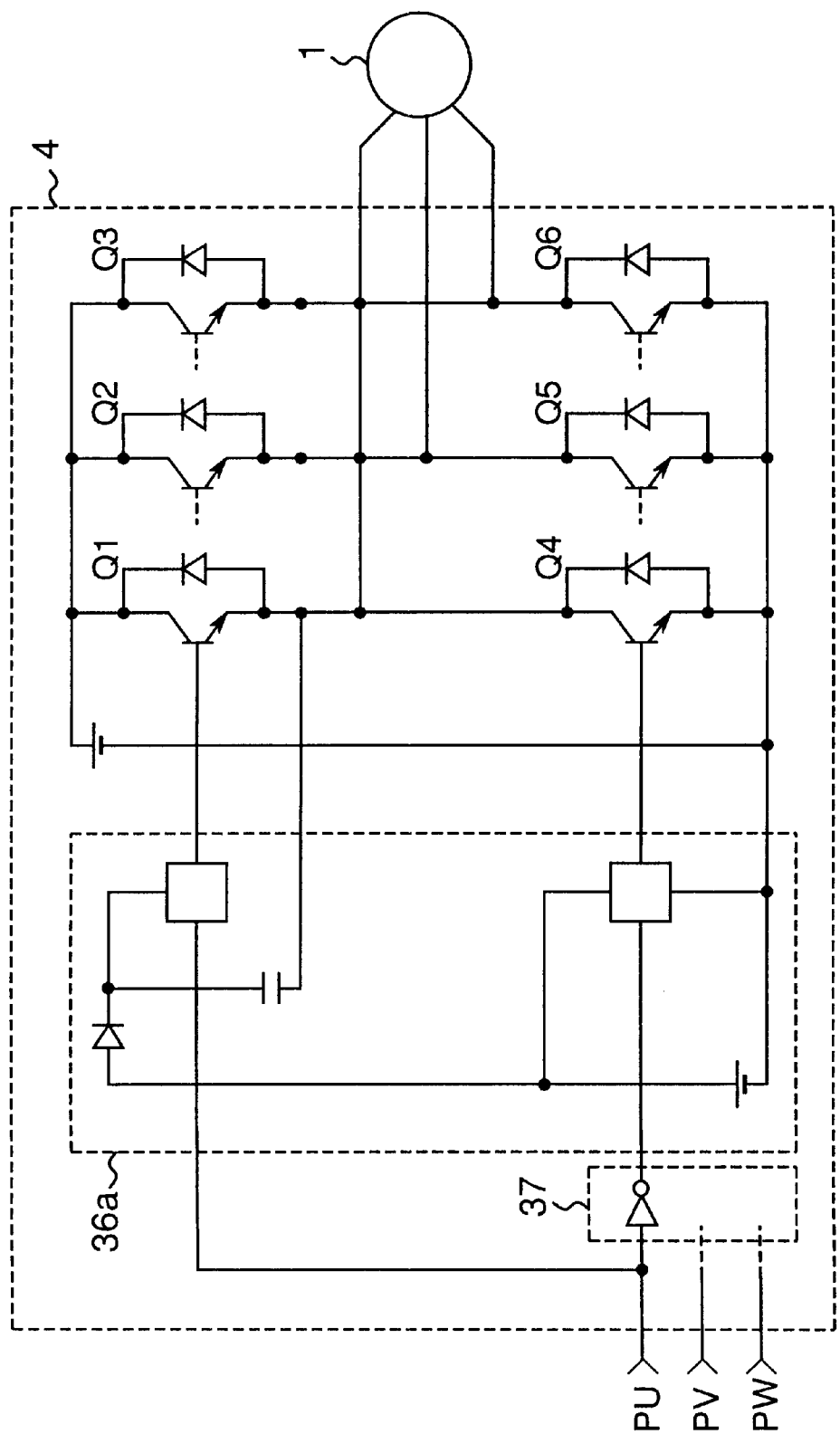
FIG. 25 is a schematic diagram of a bootstrap base drive means.

When the main circuit switching power elements Q4, Q5, and Q6 on the negative side of the main circuit dc source are all on when the second switching command signals PU2, PV2, and PW2 are all low (L, L, L), the power elements can be driven by means of a bootstrap base drive means 36a as shown in FIG. 25.

As known from the literature, this bootstrap base drive means 36a accumulates energy for driving the power element Q1 (or Q2 or Q3) on the positive side of the main circuit dc source to a capacitor C when the power element Q4 (or Q5 or Q6) on the negative side of the main circuit dc source is on, and thus drives the positive-side power element Q1 (or Q2 or Q3).

This type of base drive means has a low loss characteristic, and thus facilitates device integration.

Using a logic circuit 33 that outputs switching command signals according to truth Table 3 makes it possible to use a main circuit power element group 4 having this type of bootstrap base drive means 36a, thereby reducing loss of the motor control apparatus, and facilitating size reduction through integration.

Embodiment 8

A motor control apparatus according to this eighth embodiment of the invention differs from the above seventh embodiment in the design of the instantaneous current controller 14 and the switching command signal selector 15.

Figure 26:
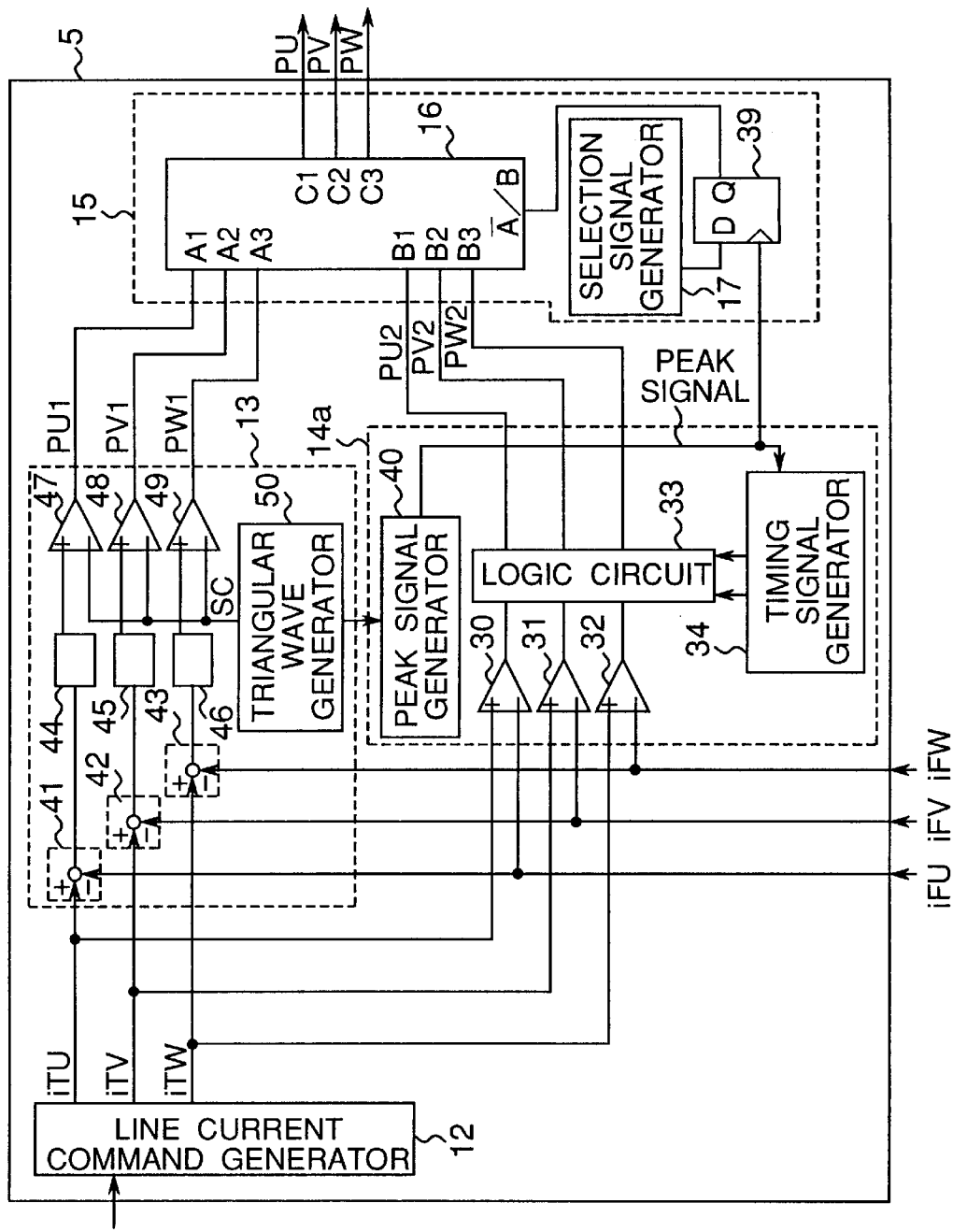
FIG. 26 is a schematic diagram of a current controller according to the present invention.

As shown in FIG. 26, an instantaneous current controller 14a according to this preferred embodiment comprises a peak signal generator 40 for applying a peak signal to the timing signal generator 34 so that the timing signal generator 34 outputs an update timing signal matched to the peak timing (maximum or minimum) of the triangular wave signal SC.

In addition, the switching command signal selector 15a further comprises a D flip-flop 39 for applying the selection signal from the selection signal generator 17 to the channel selection input A/B of selector 16 synchronized to the peak signal from the peak signal generator 40.

The operation of a motor control apparatus comprising this instantaneous current controller 14a and switching command signal selector 15a according to this preferred embodiment is described next with reference to FIG. 27.

Figure 27:
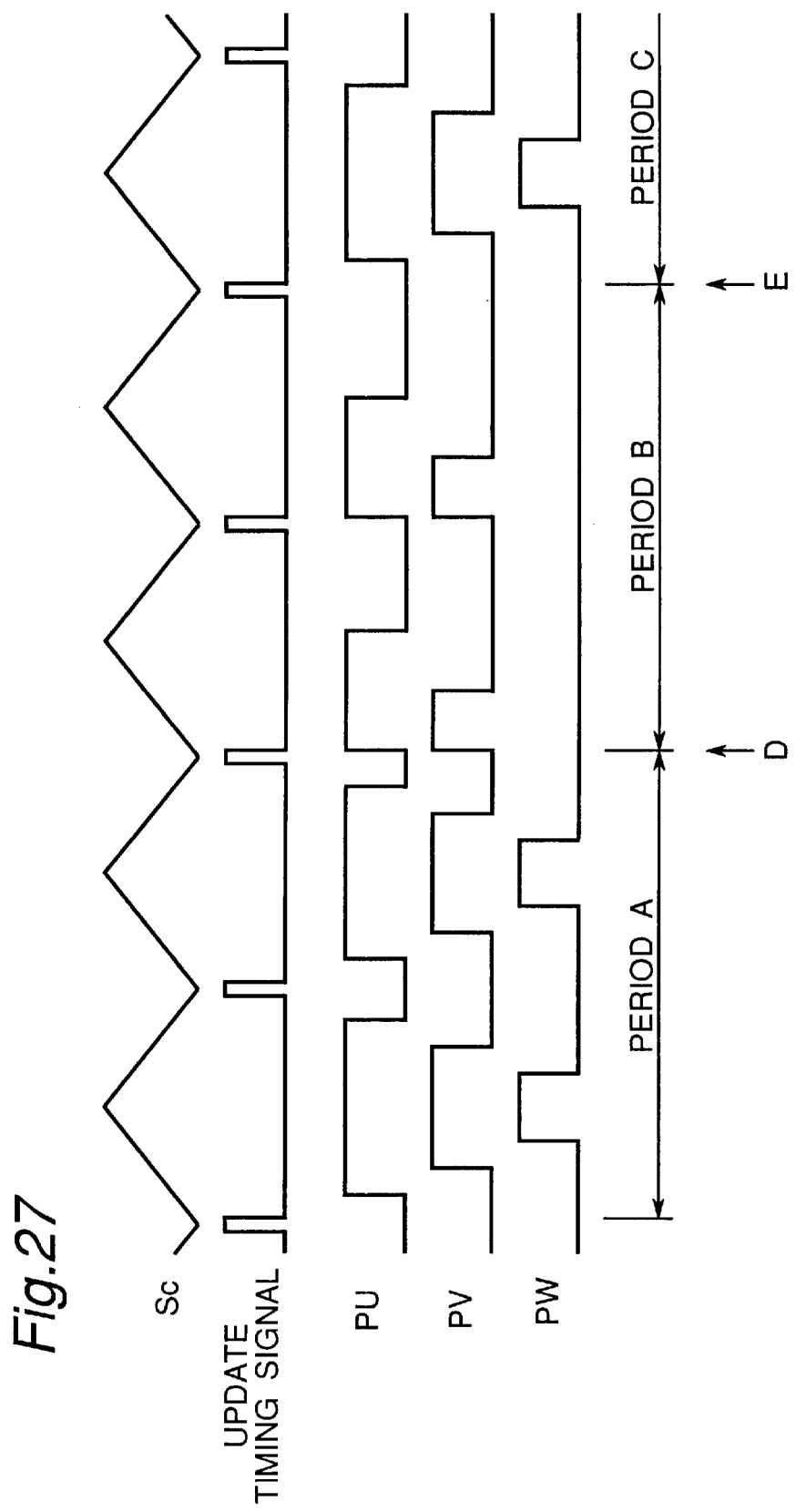
FIG. 27 is used to describe the operation of a motor control apparatus using a current controller shown in FIG. 26.

FIG. 27 is a waveform diagram showing the switching command signals PU, PV, and PW when the current control circuit is completed through average current controller 13, when the current control circuit is completed through instantaneous current controller 14, and when the current control circuit is switched therebetween. More specifically, the current control circuit is completed through average current controller 13 in periods A and C in FIG. 27; through instantaneous current controller 14a in period B; changes from average current controller 13 to instantaneous current controller 14a at operating point D; and changes from instantaneous current controller 14a to average current controller 13 at operating point E.

Let us assume below that the update timing signal is applied at each low peak of the triangular wave signal SC based on a peak signal (not shown in the figures) applied from the peak signal generator 40.

When the current control circuit is completed through average current controller 13 in periods A and C, the first switching command signals PU1, PV1 and PW1 output from the average current controller 13 are passed as the switching command signals PU, PV, and PW.

The average current controller 13 internally compares the triangular wave signal SC and voltage command output from the current error amplifier, and outputs a high or low level two-value signal based on the result of this comparison as the switching command signals. As a result, all switching command signals go high or low near the triangular wave signal SC peak.

When all switching command signals are the same level, the three-phase motor 1 halts, and the voltage of all drive coils goes substantially to zero.

As noted above, FIG. 27 shows a case in which all switching command signals are low near the triangular wave signal SC peak.

When the current control circuit is completed through instantaneous current controller 14a in period B, the switching command signals PU, PV, and PW are the second switching command signals PU2, PV2, and PW2 output from the instantaneous current controller 14a.

The instantaneous current controller 14a updates the switching command signals twice in the period between one update timing signal and the next, ultimately outputting the switching command signals all high or all low. As a result, all switching command signals are either high or low at the timing signal at which the current control circuit is switched from the instantaneous current controller 14a to the average current controller 13.

When all switching command signals are the same level, the three-phase motor 1 halts, and the voltage of all drive coils goes substantially to zero.

As noted above, FIG. 27 shows a case in which all switching command signals are low near the triangular wave signal SC peak.

To summarize the above, in periods A and C in which the switching command signals PU, PV, and PW are selected by the average current controller 13, all switching command signals go low near the low peak of the triangular wave signal SC, and the three-phase motor 1 halts.

In period B when the switching command signals PU, PV, and PW are determined by the instantaneous current controller 14, all switching command signals are low at the timing pulse, and the three-phase motor 1 again halts.

Note that the update timing occurs at the low peak of the triangular wave signal SC due to peak signal generator 40 operation. The update timing signal is therefore output at the same time the triangular wave signal SC thus goes to minimum, and the three-phase motor 1 halts.

The selection signal from the selection signal generator 17 is also applied by the D flip-flop 39 to the channel selection input A/B of the selector 16 at the same timing. As a result, current control circuit switching, that is, switching between the first and second switching command signals, occurs at the moment the three-phase motor 1 halts (at points D and E in FIG. 27).

As will be known from the above description, smooth switching of the current control circuit can be achieved in this preferred embodiment of the invention because the switching command signals for changing the current control circuit are changed at the timing at which the three-phase motor 1 halts. It is therefore possible to provide a motor control apparatus in which there is no concern about vibration or noise when the circuit is switched, and there is no concern about the stability of the power element switching frequency before and after circuit switching.

It will also be obvious that while this embodiment has been described using the low peak of the triangular wave signal SC for the update timing, the high peak can be alternatively used.

In addition, the switching command signals PU, PV, and PW are shown in FIG. 27 as all going low at the low peak of the triangular wave signal SC. If the switching command signals PU, PV, and PW go high, however, the motor will still halt, and there will be no change in the operation or benefits described above.

A motor control apparatus according to the first embodiment of the present invention comprises a switching command signal selection means having a selection signal generator for controlling whether the current control circuit is completed through an average current controller or instantaneous current controller by determining whether position deviation is within a specified range, and then selecting a first switching command signal from the average current controller and changing to a current control circuit completed through the average current controller, or selecting a second switching command signal from the instantaneous current controller and changing to a current control circuit completed through the instantaneous current controller. It is therefore possible to complete a current control circuit using a high gain instantaneous current controller until the moving element of the motor reaches a particular position, thereby achieving high speed positioning control response.

The selection signal generator can be alternatively comprised to select a current control circuit completed through average current controller or instantaneous current controller by considering speed deviation, speed change, and/or current deviation, in addition to position deviation. Positioning control response can thus be further improved, and noise suppression can also be improved.

In a motor control apparatus according to a second embodiment of the invention, the selection signal generator changes the current control circuit between the average current controller and instantaneous current controller based on whether the speed of the moving element of the motor is substantially zero. By using a current control circuit completed through instantaneous current controller having high gain and fast response until the speed is substantially zero, high speed positioning control response can be achieved.

The selection signal generator can be alternatively comprised to select a current control circuit completed through average current controller or instantaneous current controller by considering speed change and/or current deviation, in addition to speed. Positioning control response can thus be further improved, and noise suppression can also be improved.

In a motor control apparatus according to a third embodiment of the invention, the selection signal generator changes the current control circuit between the average current controller and instantaneous current controller based on whether the speed deviation is within a particular range. By using a current control circuit completed through instantaneous current controller having high gain and fast response until the speed deviation is within this particular range, high speed positioning control response can be achieved.

Transient motor vibration and noise occurring during the positioning process can also be reduced because the average current controller and instantaneous current controller operate alternately until positioning is completed.

The selection signal generator can be alternatively comprised to select a current control circuit completed through average current controller or instantaneous current controller based on speed change and/or current deviation. Positioning control response can thus be further improved, and noise suppression can also be improved.

In a motor control apparatus according to a fourth embodiment of the invention, the selection signal generator changes the current control circuit between the average current controller and instantaneous current controller based on whether the speed command is a command signal indicating that the speed of the moving element of the motor is to go substantially to zero. By using a current control circuit completed through instantaneous current controller having high gain and fast response until the speed command changes to a command holding the moving element speed at substantially zero, high speed positioning control response can be achieved.

The current control circuit can be more optimally switched between the average current controller and instantaneous current controller with a selection signal generator thus comprised because the speed command is typically applied as an analog or digital signal with higher resolution and less quantization error than a normal position detection signal.

The selection signal generator can be alternatively comprised to select a current control circuit completed through average current controller or instantaneous current controller based on speed change and/or current deviation, in addition to a speed command. Positioning control response can thus be further improved, and noise suppression can also be improved.

In a motor control apparatus according to a fifth embodiment of the invention, the selection signal generator changes the current control circuit between the average current controller and instantaneous current controller based on whether the change over time in the position command is within a specific range. By using a current control circuit completed through instantaneous current controller having high gain and fast response until the change over time in the position command is within a specific range, high speed positioning control response can be achieved.

A motor control apparatus with even more stable current control circuit switching can thus be achieved because the current control circuit is changed using a position command, which is not affected by movement of the moving element.

In a motor control apparatus according to the first to fifth embodiments described above, a current error amplifier setting arrangement can also be used to set the initial output value of the current error amplifier of the average current controller. As a result, when the current control circuit is changed from the instantaneous current controller to the average current controller, the voltage applied to the motor drive coil can be adjusted to the same value immediately before and after the current control circuit is switched. Motor behavior when the current control circuit is switched can therefore be stabilized, and vibration and noise can be suppressed.

The current error amplifier setting arrangement can also be comprised to set the initial output value by setting only the integral of the current error amplifier. The process required to set the initial output value can thus be simplified, the processing time required on a microprocessor or other computing device can be shortened, and the motor control performance can be further improved.

The instantaneous current controller in each of the above first to fifth embodiments can be further comprised with a comparator for comparing line current command signals and line current measurements, a logic circuit for outputting a second switching command signal based on comparator output, and a timing signal generator for generating a timing signal regulating the timing of logic circuit operation.

Thus comprised, the timing at which the main circuit switching power elements of the main circuit power element group switch can be controlled by the update timing signal from the timing signal generator, and the switching frequency can be stabilized. As a result, main circuit switching power element switching is stabilized, motor noise can be suppressed, and power element switching loss can be suppressed.

The logic circuit can be further comprised to output a second switching command signal whereby all power elements on the negative side of the main circuit dc source are ultimately on. The main circuit power element group can thus be used with a bootstrap base drive means. As a result, a low loss motor control apparatus suitable for integration and size reduction can be achieved.

A peak signal generator can be further provided so that the timing signal generator outputs a timing signal at the peak (high or low) timing of the PWM carrier signal, that is, a triangular wave signal, and a selection signal from the selection signal generator is enabled synchronized to this timing signal. The current control circuit can thus be switched at the same timing at which the three-phase motor halts, at which time there is no concern about vibration or noise, or about power element switching frequency disturbances.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A motor control apparatus comprising:

a motor;

a main circuit dc source;

a main circuit power element group for supplying power from the main circuit dc source to a drive coil of the motor;

a line current detector for detecting a line current flowing to a drive coil of the motor, and outputting the detected line current as a line current measurement;

a position detector for detecting movement of a moving element of the motor; and a current controller for controlling the line current so that movement detected by the position detector equals a desired value by applying a switching command signal to the main circuit power element group, the switching command signal being dependent upon a position deviation, which is a difference between movement detected by the position detector and the desired movement;

wherein said current controller comprises:

a line current command generator for outputting based on the position deviation a command signal indicative of a line current to flow to the motor;

an average current controller for comparing a PWM carrier signal and a voltage command signal obtained by amplifying a difference between the line current measurement and line current command signal, and outputting a first switching command signal;

an instantaneous current controller for outputting a second switching command signal based on a comparison of the line current measurement and line current command signal; and a switching command signal selector for selecting and outputting to the main circuit power element group as the switching command signal either the first switching command signal or second switching command signal; and the switching command signal selector selects as the switching command signal the first switching command signal when the position deviation is within a specified range, and selects the second switching command signal when the position deviation is outside this specified range.

2. The motor control apparatus as set forth in claim 1, further comprising a speed detector for detecting a motor speed and outputting a speed detection signal;

wherein in addition to selecting a switching command signal based on a position deviation, the switching command signal selector detects a speed deviation obtained from a difference between the speed detection signal and position deviation, a temporal change in the speed detection signal, and/or a current deviation obtained from a difference between a line current measurement and line current command signal, and selects as the switching command signal the first switching command signal when the detected value is within a specified range, and selects the second switching command signal when the detected value is not within the specified range.

3. A motor control apparatus comprising:

a motor;

a main circuit dc source;

a main circuit power element group for supplying power from the main circuit dc source to a drive coil of the motor;

a line current detector for detecting a line current flowing to a drive coil of the motor, and outputting the detected line current as a line current measurement;

a speed detector for detecting a motor speed and outputting a speed detection signal a position detector for detecting movement of a moving element of the motor; and a current controller for controlling the line current so that movement detected by the position detector equals a desired value by applying a switching command signal dependent upon speed deviation to the main circuit power element group, the speed deviation being a difference between the speed detection signal and position deviation, and the position deviation being a difference between the movement detected by the position detector and the desired movement;

wherein the current controller comprises:

a line current command generator for outputting based on the speed deviation a command signal indicative of a line current to flow to the motor;

an average current controller for comparing a PWM carrier signal and a voltage command signal obtained by amplifying a difference between the line current measurement and line current command signal, and outputting a first switching command signal;

an instantaneous current controller for outputting a second switching command signal based on a comparison of the line current measurement and line current command signal; and a switching command signal selector for selecting and outputting to the main circuit power element group as the switching command signal either the first switching command signal or second switching command signal; and the switching command signal selector selects as the switching command signal the first switching command signal when the speed detection signal indicates a speed of substantially zero, and otherwise selects the second switching command signal.

4. The motor control apparatus as set forth in claim 3, wherein in addition to selecting a switching command signal based on a speed detection signal, the switching command signal selector detects a temporal change in the speed detection signal, and/or a current deviation obtained from a difference between a line current measurement and line current command signal, and selects as the switching command signal the first switching command signal when the detected value is within a specified range, and selects the second switching command signal when the detected value is not within the specified range.

5. A motor control apparatus comprising:

a motor;

a main circuit dc source;

a main circuit power element group for supplying power from the main circuit dc source to a drive coil of the motor;

a line current detector for detecting a line current flowing to a drive coil of the motor, and outputting the detected line current as a line current measurement;

a speed detector for detecting a motor speed and outputting a speed detection signal a position detector for detecting movement of a moving element of the motor; and a current controller for controlling the line current so that movement detected by the position detector equals a desired value by applying a switching command signal dependent upon speed deviation to the main circuit power element group, the speed deviation being a difference between the speed detection signal and position deviation, and the position deviation being a difference between the movement detected by the position detector and the desired movement;

wherein the current controller comprises:

a line current command generator for outputting based on the speed deviation a command signal indicative of a line current to flow to the motor;

an average current controller for comparing a PWM carrier signal and a voltage command signal obtained by amplifying a difference between the line current measurement and line current command signal, and outputting a first switching command signal;

an instantaneous current controller for outputting a second switching command signal based on a comparison of the line current measurement and line current command signal; and a switching command signal selector for selecting and outputting to the main circuit power element group as the switching command signal either the first switching command signal or second switching command signal; and the switching command signal selector detects a speed deviation, a temporal change in the speed detection signal, and/or a current deviation obtained from a difference between a line current measurement and line current command signal, and selects as the switching command signal the first switching command signal when the detected value is within a specified range, and selects the second switching command signal when the detected value is not within the specified range.

6. A motor control apparatus comprising:

a motor;

a main circuit de source;

a main circuit power element group for supplying power from the main circuit dc source to a drive coil of the motor;

a line current detector for detecting a line current flowing to a drive coil of the motor, and outputting the detected line current as a line current measurement;

a speed detector for detecting a motor speed and outputting a speed detection signal a position detector for detecting movement of a moving element of the motor; and a current controller for controlling the line current so that movement detected by the position detector equals a desired value by applying a switching command signal dependent upon a speed command to the main circuit power element group, the speed command being an error amplified position deviation, the position deviation being a difference between the movement detected by the position detector and the desired movement;

wherein the current controller comprises:
  a line current command generator for outputting based on the speed command a command signal indicative of a line current to flow to the motor;
  an average current controller for comparing a PWM carrier signal and a voltage command signal obtained by amplifying a difference between the line current measurement and line current command signal, and outputting a first switching command signal;
  an instantaneous current controller for outputting a second switching command signal based on a comparison of the line current measurement and line current command signal; and
  a switching command signal selector for selecting and outputting to the main circuit power element group as the switching command signal either the first switching command signal or second switching command signal; and
  the switching command signal selector selects as the switching command signal the first switching command signal when the speed command indicates a speed of substantially zero, and otherwise selects the second switching command signal.

7. The motor control apparatus as set forth in claim 6, wherein in addition to selecting a switching command signal based on a speed command, the switching command signal selector detects a temporal change in the speed detection signal, and/or a current deviation obtained from a difference between a line current measurement and line current command signal, and selects as the switching command signal the first switching command signal when the detected value is within a specified range, and selects the second switching command signal when the detected value is not within the specified range.

8. A motor control apparatus comprising:

a motor;

a main circuit dc source;

a main circuit power element group for supplying power from the main circuit dc source to a drive coil of the motor;

a line current detector for detecting a line current flowing to a drive coil of the motor, and outputting the detected line current as a line current measurement;

a position detector for detecting movement of a moving element of the motor; and a current controller for controlling the line current so that movement detected by the position detector equals a desired value determined according to a position command applying a switching command signal dependent upon a position deviation to the main circuit power element group, the position deviation being a difference between the movement detected by the position detector and the desired movement;

wherein the current controller comprises:
  a line current command generator for outputting based on the position deviation a command signal indicative of a line current to flow to the motor;
  an average current controller for comparing a PWM carrier signal and a voltage command signal obtained by amplifying a difference between the line current measurement and line current command signal, and outputting a first switching command signal;
  an instantaneous current controller for outputting a second switching command signal based on a comparison of the line current measurement and line current command signal; and
  a switching command signal selector for selecting and outputting to the main circuit power element group as the switching command signal either the first switching command signal or second switching command signal; and
  the switching command signal selector selects as the switching command signal the second switching command signal when a temporal change in the position command is not within a specified range, and selects the first switching command signal while temporal change in the position command is within the specified range.

9. The motor control apparatus as set forth in claim 1, further comprising a current error amplifier setting arrangement for setting an initial output value of a current error amplifier contained in the average current controller, wherein the average current controller contains the current error amplifier for amplifying a difference between a line current measurement and line current command signal, compares with a PWM carrier signal an output from the current error amplifier as a voltage command signal, and outputs a first switching command signal, and when the switching command signal selector switches the switching command signal selection to the first switching command signal from the second switching command signal output from the instantaneous current controller, the current error amplifier setting arrangement completes setting the initial output value of the current error amplifier before the switching command signal selection is switched so that immediately after the switching command signal selection is switched the initial output value is output from the current error amplifier.

10. The motor control apparatus as set forth in claim 9, wherein the current error amplifier setting arrangement sets an integral of the initial output value of the current error amplifier.

11. The motor control apparatus as set forth in claim 9, wherein the current error amplifier setting arrangement sets as the initial output value of the current error amplifier a value calculated from the second switching command signal, which is output from the instantaneous current controller, so that the second switching command signal immediately before the switching command signal is changed matches the first switching command signal immediately after the switching command signal is changed.

12. The motor control apparatus as set forth in claim 10, wherein the current error amplifier setting arrangement sets as the initial output value of the current error amplifier a value calculated from the second switching command signal, which is output from the instantaneous current controller, so that the second switching command signal immediately before the switching command signal is changed matches the first switching command signal immediately after the switching command signal is changed.

13. The motor control apparatus as set forth in claim 1, wherein:

the motor is a three phase motor;

the line current detector measures line current flowing to each phase drive coil of the three-phase motor, and outputs a first line current measurement, second line current measurement, and third line current measurement;

the line current command generator of the current controller generates and outputs a first line current command signal, a second line current command signal, and a third line current command signal, each indicative of a line current to flow each phase drive coil of the three-phase motor;

the main circuit power element group has a three phase bridge configuration comprising at least:
 a first main circuit switching power element connected to a positive terminal of the main circuit dc source for supplying a first line current to the three-phase motor,
 a second main circuit switching power element connected to a positive terminal of the main circuit dc source for supplying a second line current to the three-phase motor,
 a third main circuit switching power element connected to a positive terminal of the main circuit dc source for supplying a third line current to the three-phase motor,
 a fourth main circuit switching power element connected to a negative terminal of the main circuit dc source for supplying a first line current to the three-phase motor,
 a fifth main circuit switching power element connected to a negative terminal of the main circuit dc source for supplying a second line current to the three-phase motor, and
 a sixth main circuit switching power element connected to a negative terminal of the main circuit dc source for supplying a third line current to the three-phase motor;

the instantaneous current controller of the current controller comprises:
 a first comparator for comparing the first line current command signal and first line current measurement, and setting a first line current comparison result to high when the first line current measurement is greater than the first line current command signal, and low when the first line current measurement is less than the first line current command signal;
 a second comparator for comparing the second line current command signal and second line current measurement, and setting a second line current comparison result to high when the second line current measurement is greater than the second line current command signal, and low when the second line current measurement is less than the second line current command signal;
 a third comparator for comparing the third line current command signal and third line current measurement, and setting a third line current comparison result to high when the third line current measurement is greater than the third line current command signal, and low when the third line current measurement is less than the third line current command signal;
 a logic circuit to which the first line current comparison result, second line current comparison result, and third line current comparison result are supplied for generating a second switching command signal applied to the first, second, third, fourth, fifth, and sixth main circuit switching power elements; and
 a timing signal generator for generating and applying to the logic circuit a periodic update timing signal;
 wherein the logic circuit determines the on and off state for the first, second, third, fourth, fifth, and sixth main circuit switching power elements at the timing indicated by the update timing signal and when the first, second, and third line current comparison results change to output the second switching command signal.

14. The motor control apparatus as set forth in claim 13, wherein the timing signal generator outputs the update timing signal near the high or low peak of the PWM carrier signal of the average current controller, and the switching command signal selector switches between the first switching command signal and second switching command signal synchronized to the update timing signal.

15. The motor control apparatus as set forth in claim 3, further comprising a current error amplifier setting arrangement for setting an initial output value of a current error amplifier contained in the average current controller, wherein the average current controller contains the current error amplifier for amplifying a difference between a line current measurement and line current command signal, compares with a PWM carrier signal an output from the current error amplifier as a voltage command signal, and outputs a first switching command signal, and when the switching command signal selector switches the switching command signal selection to the first switching command signal from the second switching command signal output from the instantaneous current controller, the current error amplifier setting arrangement completes setting the initial output value of the current error amplifier before the switching command signal selection is switched so that immediately after the switching command signal selection is switched the initial output value is output from the current error amplifier.

16. The motor control apparatus as set forth in claim 15, wherein the current error amplifier setting arrangement sets an integral of the initial output value of the current error amplifier.

17. The motor control apparatus as set forth in claim 15, wherein the current error amplifier setting arrangement sets as the initial output value of the current error amplifier a value calculated from the second switching command signal, which is output from the instantaneous current controller, so that the second switching command signal immediately before the switching command signal is changed matches the first switching command signal immediately after the switching command signal is changed.

18. The motor control apparatus as set forth in claim 16, wherein the current error amplifier setting arrangement sets as the initial output value of the current error amplifier a value calculated from the second switching command signal, which is output from the instantaneous current controller, so that the second switching command signal immediately before the switching command signal is changed matches the first switching command signal immediately after the switching command signal is changed.

19. The motor control apparatus as set forth in claim 3, wherein:

the motor is a three phase motor;

the line current detector measures line current flowing to each phase drive coil of the three-phase motor, and outputs a first line current measurement, second line current measurement, and third line current measurement;

the line current command generator of the current controller generates and outputs a first line current command signal, a second line current command signal, and a third line current command signal, each indicative of a line current to flow each phase drive coil of the three-phase motor;

the main circuit power element group has a three phase bridge configuration comprising at least:

a first main circuit switching power element connected to a positive terminal of the main circuit dc source for supplying a first line current to the three-phase motor, a second main circuit switching power element connected to a positive terminal of the main circuit dc source for supplying a second line current to the three-phase motor, a third main circuit switching power element connected to a positive terminal of the main circuit dc source for supplying a third line current to the three-phase motor, a fourth main circuit switching power element connected to a negative terminal of the main circuit dc source for supplying a first line current to the three-phase motor, a fifth main circuit switching power element connected to a negative terminal of the main circuit dc source for supplying a second line current to the three-phase motor, and a sixth main circuit switching power element connected to a negative terminal of the main circuit dc source for supplying a third line current to the three-phase motor;

the instantaneous current controller of the current controller comprises:

a first comparator for comparing the first line current command signal and first line current measurement, and setting a first line current comparison result to high when the first line current measurement is greater than the first line current command signal, and low when the first line current measurement is less than the first line current command signal;

a second comparator for comparing the second line current command signal and second line current measurement, and setting a second line current comparison result to high when the second line current measurement is greater than the second line current command signal, and low when the second line current measurement is less than the second line current command signal;

a third comparator for comparing the third line current command signal and third line current measurement, and setting a third line current comparison result to high when the third line current measurement is greater than the third line current command signal, and low when the third line current measurement is less than the third line current command signal;

a logic circuit to which the first line current comparison result, second line current comparison result, and third line current comparison result are supplied for generating a second switching command signal applied to the first, second, third, fourth, fifth, and sixth main circuit switching power elements; and a timing signal generator for generating and applying to the logic circuit a periodic update timing signal;

wherein the logic circuit determines the on and off state for the first, second, third, fourth, fifth, and sixth main circuit switching power elements at the timing indicated by the update timing signal and when the first, second, and third line current comparison results change to output the second switching command signal.

20. The motor control apparatus as set forth in claim 19, wherein the timing signal generator outputs the update timing signal near the high or low peak of the PWM carrier signal of the average current controller, and the switching command signal selector switches between the first switching command signal and second switching command signal synchronized to the update timing signal.

* * * * *